(12) United States Patent
Matsuno et al.

(10) Patent No.: US 7,610,982 B2
(45) Date of Patent: Nov. 3, 2009

(54) FRONT AND REAR DRIVE POWER DISTRIBUTION CONTROL DEVICE FOR VEHICLE

(75) Inventors: Koji Matsuno, Tokyo (JP); Tatsunori Nagura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 504 days.

(21) Appl. No.: 11/448,752

(22) Filed: Jun. 8, 2006

(65) Prior Publication Data

US 2006/0278460 A1 Dec. 14, 2006

(30) Foreign Application Priority Data

Jun. 10, 2005 (JP) .............................. 2005-171558
Jun. 10, 2005 (JP) .............................. 2005-171559

(51) Int. Cl.
*B60K 17/354* (2006.01)
(52) U.S. Cl. ......................... 180/245; 701/69
(58) Field of Classification Search ................ 180/197, 180/233, 248, 249; 701/69, 70, 88, 89
See application file for complete search history.

(56) References Cited

U.S. PATENT DOCUMENTS

| 6,094,614 | A | 7/2000 | Hiwatashi | |
| 6,131,054 | A * | 10/2000 | Shibahata | ...................... 701/1 |
| 6,604,595 | B2 | 8/2003 | Sakakiyama | |
| 6,698,541 | B2 | 3/2004 | Sakakiyama | |
| 2002/0055416 | A1 | 5/2002 | Sakakiyama | |
| 2004/0035622 | A1 | 2/2004 | Ito et al. | |
| 2004/0064239 | A1 | 4/2004 | Nagura et al. | |

FOREIGN PATENT DOCUMENTS

| EP | 1203688 A2 | 5/2002 |
| EP | 1375231 A2 | 6/2003 |
| EP | 1 400 390 A | 3/2004 |
| JP | 11-059216 | 3/1999 |
| JP | 2002-127772 | 5/2002 |

OTHER PUBLICATIONS

Extended European Search Report issued in corresponding European Application No. EP 06011843.7 dated Oct. 1, 2008.
Partial European Search Report for EP 06011843, dated Jul. 3, 2008.

* cited by examiner

*Primary Examiner*—Lesley D Morris
*Assistant Examiner*—Marc A Scharich
(74) *Attorney, Agent, or Firm*—Smith, Gambrell & Russell, LLP

(57) ABSTRACT

A drive power distribution control section calculates an engaging torque of clutch means including an input torque sensitive transfer torque, a steering angle/yaw rate sensitive transfer torque, and a tack-in prevention transfer torque. The input torque sensitive transfer torque is estimated by using respective time constants corresponding to an increasing or decreasing of the engine torque. Also, when the input torque is large, a variation of the input torque sensitive transfer torque is increased. The steering angle/yaw rate sensitive transfer torque is corrected by an yaw moment according to an vehicle slip angular velocity, and an upper limit is set on the variation of the yaw moment per time.

20 Claims, 21 Drawing Sheets

FRONT AND REAR DRIVE POWER DISTRIBUTION CONTROL DEVICE FOR VEHICLE

This application claims benefit of Japanese Application No. 2005-171558 filed on Jun. 10, 2005, and No. 2005-171559 filed on Jun. 10, 2005, the contents of which are incorporated herein by this reference.

BACKGROUND OF THE INVENTION

1. Field of the Invention

The present invention relates to a front and rear drive power distribution control device for a vehicle, for controlling drive power distribution between front and rear wheels.

2. Description of Related Art

Conventionally, as a front and rear drive power distribution control device for controlling drive power distribution between front and rear wheels of a vehicle using clutch means, various methods are known for carrying out appropriate setting of engaging force of the clutch means according to input torque from an engine.

For example, Japanese patent laid-open No. 2002-127772 discloses technology for calculating torque sensitive torque constituting engaging torque of the clutch means by correcting input torque from an engine using vehicle speed, steering wheel angle, road surface μ (coefficient of friction on a road) etc.

However, in the technology for calculating torque sensitive torque disclosed in Japanese patent laid-open No. 2002-127772, if input torque from the engine is large, the torque sensitive torque is set correspondingly large, but if the torque sensitive torque is set in a linear manner with respect to the input torque from the engine, there is a danger that torque sensitive torque in a region where drive torque is large and redundant torque for each wheel is large will be insufficient. If input torque estimate is also set without taking into consideration response characteristic of the engine torque with respect to accelerator operation, there is a problem particularly with an engine with a supercharger, that estimation precision is low. If torque sensitive torque is added first, before reaching a slip state for each wheel in response to the accelerator operation, there is the possibility of a problem arising where differential motion for each wheel is inhibited by the clutch means and it is not possible to exert sufficient cornering. Further, when using a calculated road surface μ value as a corrected value, the response is delayed, and it is necessary to prepare a map according to road surface μ value, which complicates control.

On the other hand, as a front and rear wheel drive power distribution control device, there are devices in which yaw moment required for control is calculated and a control value is set according to this calculated yaw moment. With this type of front and rear wheel drive power distribution control device for controlling according to yaw moment, that is with a device that adopts steering angle feed forward control and yaw rate feed back control, it is effective for improving driving performance traveling on a high μ road, but when traveling on a low μ road an excessive turning moment is added, and there is a danger of the vehicle's tendency to spin being increased.

Differing from the above described front and rear drive power distribution control devices for controlling according to a yaw moment value, various devices have also been proposed for controlling front and rear drive power distribution by setting a control amount according to the road surface μ, such as is described, for example, in Japanese patent laid-open No. Hei. 11-59216.

With the technology disclosed in Japanese patent laid-open No. Hei. 11-59216, it is possible to execute optimum drive power distribution control not only for high μ roads but also for low μ roads. However, there is a delay in the responsiveness due to road surface μ estimation, and there is a problem that it is not possible to handle a rapidly changing road surface with good response. By adding other parameters such as lateral acceleration etc. as control factors, to the above described steering angle feed forward control and yaw rate feed back control, it is possible to consider prevention of steady turning moment on a low μ surface. However, in this case, an excessive turning moment is added when commencing steering with a low lateral acceleration and when the vehicle is showing a tendency to spin, and there is a danger of insufficient stability when high speed traveling on a low μ road etc.

The present invention has been conceived in view of the above-described situation, and a first object of the invention is to provide a front and rear drive power distribution control device for a vehicle that is a simple configuration and is not dependent of a road surface μ value, and that can perform optimum drive power distribution with an appropriate operation even with accelerator operation, without resulting in insufficient torque sensitive torque in a region redundant torque for each wheel having large torque. A second object of the invention is to provide a front and rear drive power distribution control device for a vehicle that can optimally handle not only high μ roads but also low μ roads and roads that suddenly change in μ with good response and in a stable manner, and can perform front and rear drive power distribution having good precision while reliably preventing a turning moment being unnecessarily added in situations where the vehicle in unstable or transitional.

SUMMARY OF THE INVENTION

A front and rear drive power distribution control device for a vehicle of the present invention comprises: clutch means for varying drive power distribution between front and rear wheels; input torque sensitive torque calculating means for calculating engaging torque of the clutch means according to input torque from at least an engine; and control means for controlling the clutch means on the basis of at least the engaging torque calculated by the input torque sensitive torque calculating means, wherein the input torque sensitive torque calculating means sets an amount of variation in engaging torque with respect to the input torque from the engine to a larger value in a region where input torque from the engine is large than in a region where input torque from the engine is small.

The above and other objects, features and advantages of the invention will become more clearly understood from the following description referring to the accompanying drawings.

DETAILED DESCRIPTION OF PREFERRED EMBODIMENTS

One embodiment of the present invention will be described in the following based on FIG. 1 to FIG. 22.

Figure 1:
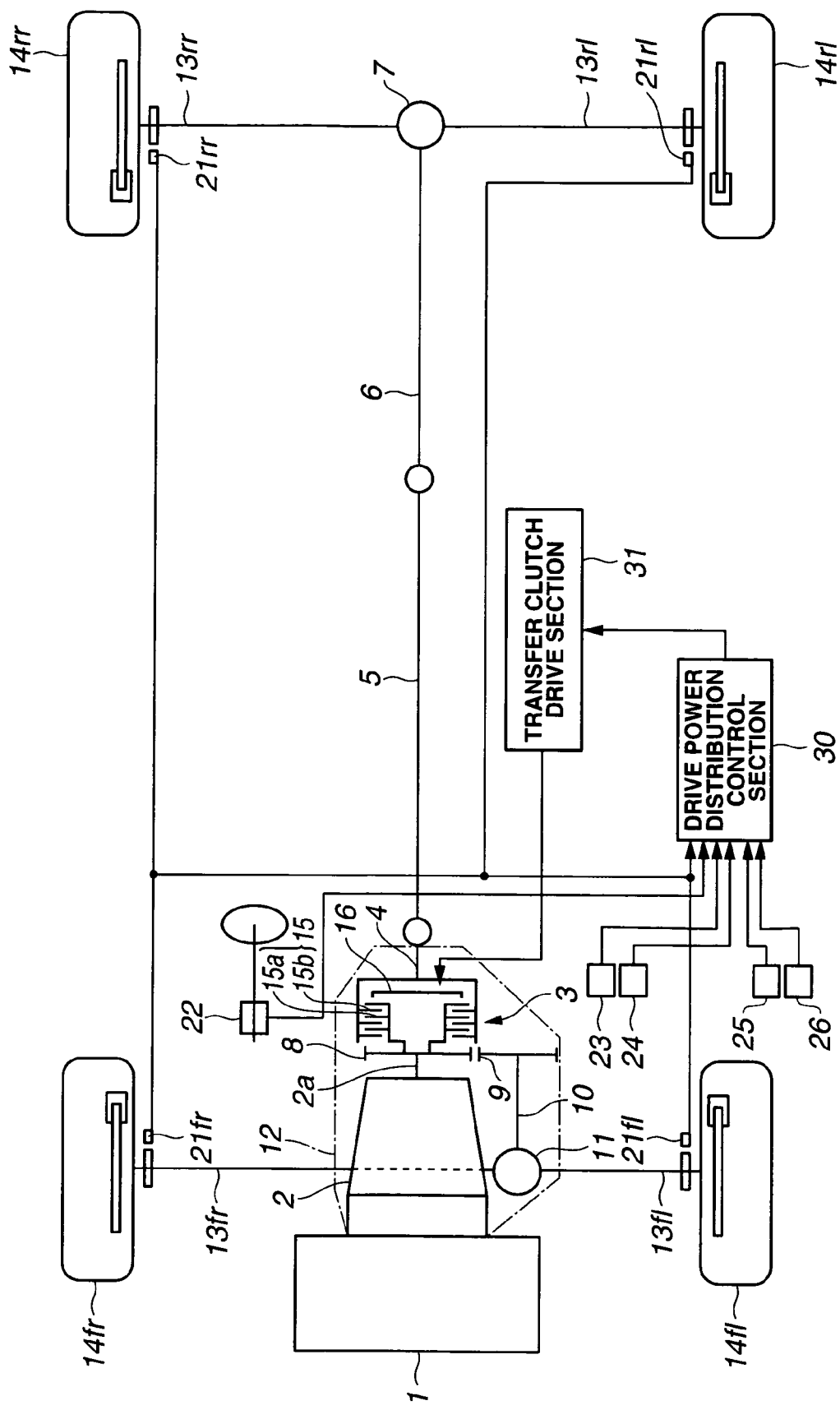
FIG. 1 is an explanatory drawing showing the schematic configuration of an overall drive system of a vehicle.

In FIG. 1, reference numeral 1 represents an engine arranged at a front part of a vehicle, and drive power from the engine 1 is transmitted from an automatic transmission (illustrated also including a torque converter) 2 behind the engine 1, via a transmission output shaft 2a, to a transfer 3.

Further, drive power transmitted to the transfer 3 is input on the one hand to a rear wheel final reduction unit 7 by way of a rear drive shaft 4, propeller shaft 5 and drive pinion shaft section 6, and input to a front wheel final reduction unit 11 by way of a reduction drive gear 8, reduction driven gear 9, and front drive shaft 10 constituting the drive pinion shaft section. Here, the automatic transmission 2, transfer 3 and front wheel final reduction unit 11 etc. are provided integrally inside a case 12.

Also, the drive power input to the rear wheel final reduction unit 7 is transmitted to a rear left wheel 14rl via a rear wheel left drive shaft 13rl, and transmitted to a rear right wheel 14rr via a rear wheel right drive shaft 13rr.

On the other hand, the drive power input to the front wheel final reduction unit 11 is transmitted to a front left wheel 14fl via a front wheel left drive shaft 13fl, and transmitted to a front right wheel 14fr via a front wheel right drive shaft 13fr.

The transfer 3 is comprised of a wet-type multiple disc clutch (transfer clutch) 15 as a variable capacity torque transmission type clutch (clutch means) formed by mutually superimposing drive plates 15a provided at a reduction drive gear 8 side, and driven plates 15b provided at the rear drive shaft 4 side, and a transfer piston 16 for variably supplying engaging force (transfer torque: engaging torque) of the transfer clutch 15.

Accordingly, controlling transfer torque of the transfer clutch 15 by controlling pressing force against the transfer piston 16 provides a four-wheel drive vehicle of front engine/front wheel drive base (FF base) capable of varying torque distribution ratio between front wheels and rear wheels from, for example, 100:0 to 50:50.

Also, pressing force of the transfer piston 16 is operated to a transfer clutch drive section 31 constituting hydraulic circuits having a plurality of solenoid valves. Control signals (signals output according to transfer torque to the solenoid valves) for driving the transfer clutch drive section 31 are output from a drive power distribution control section 30, which will be described later.

The vehicle is provided with sensor types for detecting parameters required for drive power distribution control executed as will be described later by the drive power distribution control section 30. Specifically, vehicle wheel speeds ωfl, ωfr, ωrl, ωrr for each of the vehicle wheels 14fl, 14fr, 14rl, 14rr are detected by vehicle wheel sensors 21fl, 21fr, 21rl, 21rr, steering wheel angle θH is detected by a steering wheel angle sensor 22, lateral acceleration actually arising in the vehicle (hereafter referred to as actual lateral acceleration) $(d^2y/dt^2)$ is detected by a lateral acceleration sensor 23, yaw rate γ actually arising in the vehicle (hereafter referred to as actual yaw rate) is detected by a yaw rate sensor 24, accelerator opening degree θACC is detected by an accelerator opening degree sensor 25, engine speed NE is detected by an engine speed sensor 26, and these values are input to the drive power distribution control section 30.

Based on each of the input signals described above, the drive power distribution control section 30 then calculates front and rear wheel drive power distribution used by the transfer clutch 15 as transfer torque TLSD, and outputs to the transfer clutch drive section 31.

Figure 2:
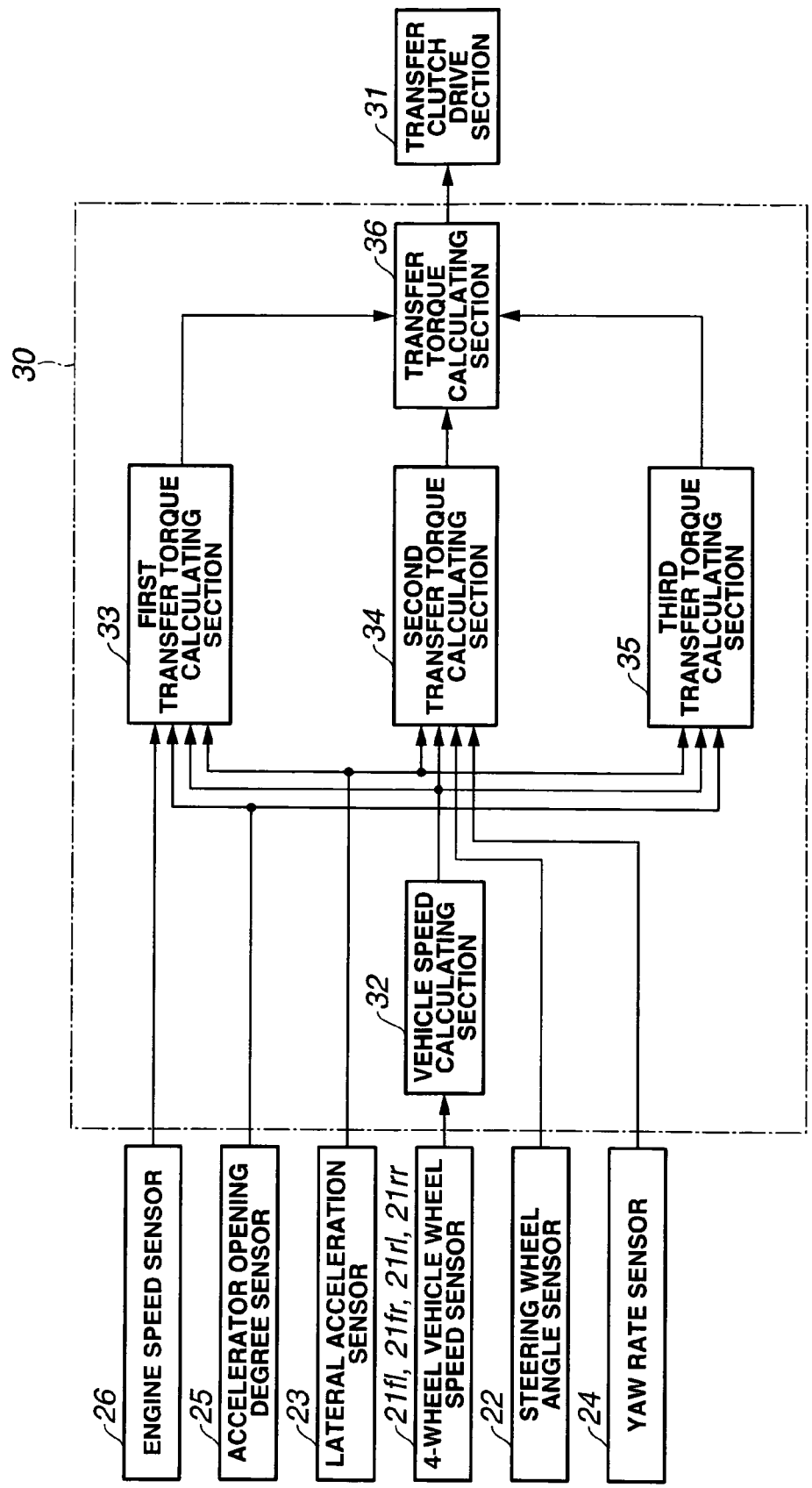
FIG. 2 is a functional block diagram of a drive power distribution control section.

Specifically, as shown in FIG. 2, the drive power distribution control section 30 is mainly made up of a vehicle speed calculating section 32, a first transfer torque calculating section 33, a second transfer torque calculating section 34, a third transfer torque calculating section 35, and a transfer torque calculating section 36.

The vehicle speed calculating section 32 receives as input wheel speeds ωfl, ωfr, ωrl and ωrr of each of the wheels 14fl, 14fr, 14rl, 14rr from four wheel speed sensors, namely each of the wheel speed sensors 21fl, 21fr, 21rl and 21rr. Vehicle speed V(=(ωfl+ωfr+ωrl+ωrr)/4) is then calculated, for example, by calculating an average of these values, and is output to the first transfer torque calculating section 33, the second transfer torque calculating section 34 and the third transfer torque calculating section 35.

The first transfer torque calculating section 33 receives as inputs actual lateral acceleration $(d^2y/dt^2)$ from the lateral acceleration sensor 23, accelerator opening degree θACC from the accelerator opening degree sensor 25, engine speed Ne from the engine speed sensor 26 and vehicle speed V from the vehicle speed calculating section 32. From these input signals, the first transfer torque calculating section 33 then calculates input torque sensitive transfer torque TLSDI as engaging torque corresponding to the input torque from the engine and outputs to the transfer torque calculating section 36.

Figure 3:
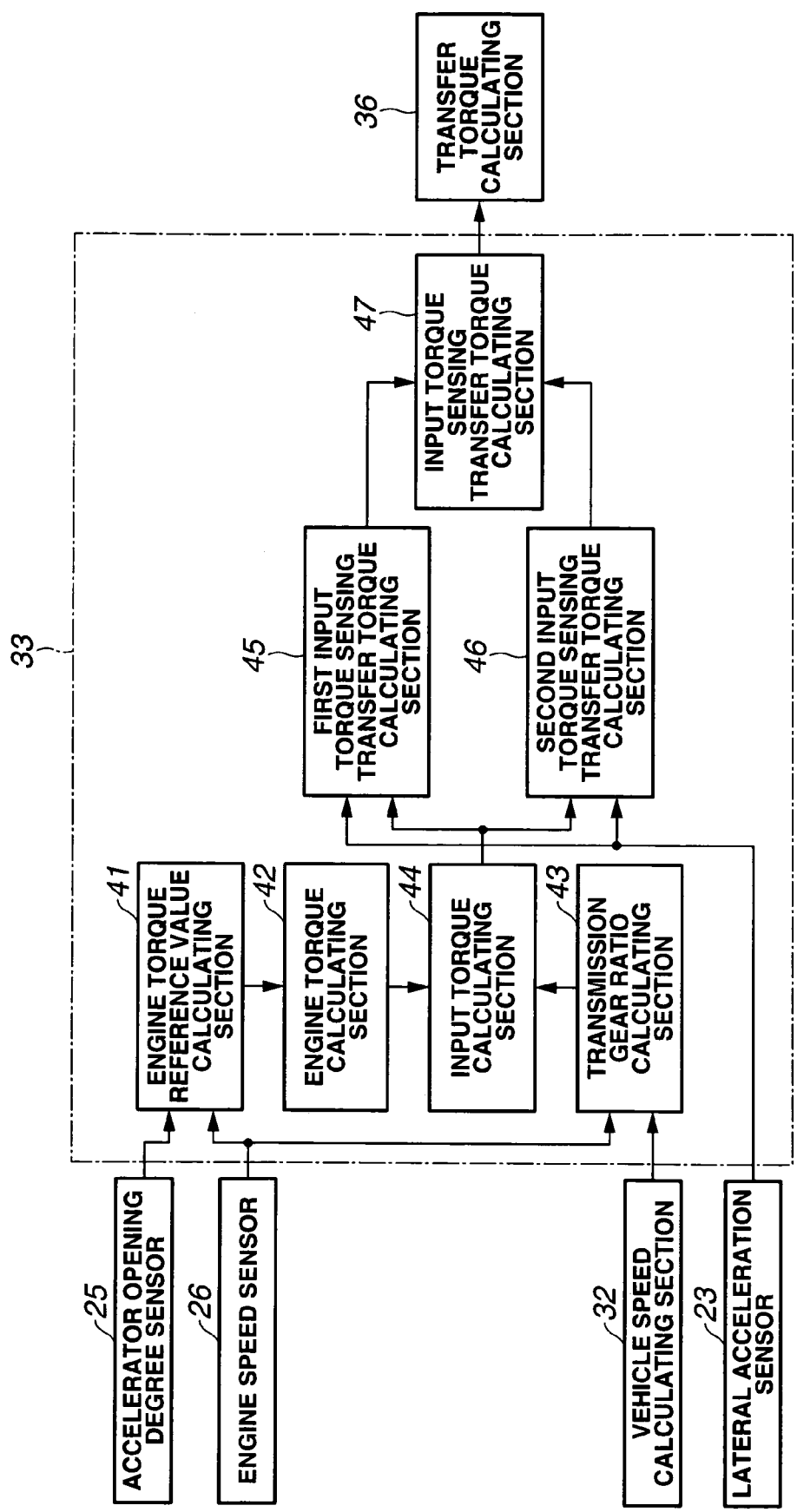
FIG. 3 is a functional block diagram of a first transfer torque calculating section.

Specifically, as shown in FIG. 3, the first transfer torque calculating section 33 is mainly made up of an engine torque reference value calculating section 41, an engine torque calculating section 42, a transmission gear ratio calculating section 43, an input torque calculating section 44, a first input torque sensitive transfer torque calculating section 45, a second input torque sensitive transfer torque calculating section 46 and an input torque sensitive transfer torque calculating section 47.

The engine torque reference value calculating section 41 receives as inputs the accelerator opening degree θACC from the accelerator opening degree sensor 25, and engine speed NE from the engine speed sensor 26. Based on the accelerator opening degree θACC and the engine speed NE, the engine torque is obtained by referencing a previously provided engine characteristic map, and this engine torque is output to the engine torque calculating section 42 as engine torque reference value TEG0.

The engine torque calculating section 42 receives as input the engine torque reference value TEG0 from the engine torque reference value calculating section 41. Engine torque TEG is then calculated from equation (1) or equation (2) below, and output to the input torque calculating section 44.

When TEG0($k$)>TEG(k−1) (When engine torque is increasing)

$$TEG = (1/(1+TEGTu \cdot s)) \cdot TEG0 \qquad (1)$$

When TEG0($k$)≦TEG(k−1) (When engine torque is decreasing)

$$TEG = (1/(1+TEGTd \cdot s)) \cdot TEG0 \qquad (2)$$

where TEG0($k$) is the engine torque reference value this time, TEG(k−1) is engine torque the previous time, s is a differential operator, TEGTu is an engine torque increase side delay time constant (for example, 0.5), and TEGTd is an engine torque decrease side delay time constant (for example, 0.2).

Specifically, a fixed time is taken from operating the accelerator until it shows up in engine torque, and particularly in a supercharged engine, when the accelerator is stepped on, compared to when the accelerator is released time is taken for variation to appear in the engine speed. Taking this into consideration, by having a delay characteristics where delay time constant is varied for when the engine torque is increasing and when engine torque is decreasing, so that delay is made large by setting the delay time constant large when engine torque is increasing and delay is made small by setting the time constant small when engine torque is decreasing, engine torque TEG can be obtained with good precision.

In this way, in estimating engine torque TEG, by using separate time constants for increasing and decreasing engine torque it is possible to appropriately estimate input torque TCD to the transfer clutch 15 which will be described later, according to transition characteristics of the engine, there is only a slight delay in the rising of the input torque TCD when the accelerator is ON, and it is possible to improve cornering.

The transmission gear ratio calculating section 43 receives as inputs the engine speed NE from the engine speed sensor 26, and vehicle speed V from the vehicle speed calculating section 32. Transmission gear ration GTM is then calculated using the following equation (3) and output to the input torque calculating section 44.

$$GTM = (NE \cdot Rt)/((V/3.6) \cdot Gfin) \qquad (3)$$

where Rt is tire diameter, and Gfin is final gear ratio.

The input torque calculating section 44 is input with engine torque TEG from the engine torque calculating section 42, and input with transmission gear ration GTM from the transmission gear ratio calculating section 43, calculated input torque TCD from equation (4) below, and outputs the calculated input torque to the first input torque sensitive transfer torque calculating section 45, and the second input torque sensitive transfer torque calculating section 46.

$$TCD = TEG \cdot GTM \qquad (4)$$

The first input torque sensitive transfer torque calculating section 45 receives as inputs the actual lateral acceleration ($d^2y/dt^2$) from the lateral acceleration sensor 23, and input torque TCD from the input torque calculating section 44, and calculates a first input torque sensitive transfer torque TLSDI1 from either of the following equations (5) to (8) according to the actual lateral acceleration ($d^2y/dt^2$)

When ($d^2y/dt^2$)≦($d^2yL/dt^2$)

$$TLSDI1 = TBRL1 \cdot |TCD| \qquad (5)$$

When ($d^2yL/dt^2$)<($d^2y/dt^2$)≦($d^2yM/dt^2$)

$$TLSDI1 = TBRL1 \cdot |TCD| \cdot ((d^2yM/dt^2)-(d^2y/dt^2))/((d^2yM/dt^2)-(d^2yL/dt^2)) + TBRM1 \cdot |TCD| \cdot ((d^2y/dt^2)-(d^2yL/dt^2))/((d^2yM/dt^2)-(d^2yL/dt^2)) \qquad (6)$$

When ($d^2yM/dt^2$)<($d^2y/dt^2$)≦($d^2yH/dt^2$)

$$TLSDI1 = TBRM1 \cdot |TCD| \cdot ((d^2yH/dt^2)-(d^2y/dt^2))/((d^2yH/dt^2)-(d^2yM/dt^2)) + TBRH1 \cdot |TCD| \cdot ((d^2y/dt^2)-(d^2yM/dt^2))/((d^2yH/dt^2)-(d^2yM/dt^2)) \qquad (7)$$

When ($d^2y/dt^2$)>($d^2yH/dt^2$)

$$TLSDI1 = TBRH1 \cdot |TCD| \qquad (8)$$

where with ($d^2yL/dt^2$), ($d^2yM/dt^2$), ($d^2yH/dt^2$) respectively set in advance by experimentation etc., ($d^2yL/dt^2$)<($d^2yM/dt^2$)<($d^2yH/dt^2$), for example, ($d^2yL/dt^2$)=1, ($d^2yM/dt^2$)=3, ($d^2yH/dt^2$)=9.

Also, TBRL1, TBRM1, TBRH1 are input torque sensitive proportional constants, and set in advance through experimentation etc., then TBRL1>TBRM1>TBRH1, for example, TBRL1=0.4, TBRM1=0.3, TBRH1=0.2.

Specifically, when ($d^2y/dt^2$)≦($d^2yL/dt^2$) first input torque sensitive transfer torque TLSDI1 is calculated using input torque sensitive proportional constant TBRL1.

Also, when ($d^2yL/dt^2$)<($d^2y/dt^2$)≦($d^2yM/dt^2$), first input torque sensitive transfer torque TLSDI1 is calculated by interpolating between ($d^2yL/dt^2$) and ($d^2yM/dt^2$) using input torque sensitive proportional constants TBRL1 and TBRM1.

Further, when ($d^2yM/dt^2$)<($d^2y/dt^2$)≦($d^2yH/dt^2$), first input torque sensitive transfer torque TLSDI1 is calculated by interpolating between ($d^2yM/dt^2$) and ($d^2yH/dt^2$) using input torque sensitive proportional constants TBRM1 and TBRH1.

Also, when ($d^2y/dt^2$)>($d^2yH/dt^2$) first input torque sensitive transfer torque TLSDI1 is calculated using input torque sensitive proportional constant TBRH1.

The second input torque sensitive transfer torque calculating section 46 receives as inputs the actual lateral acceleration ($d^2y/dt^2$) from the lateral acceleration sensor 23, and input torque TCD from the input torque calculating section 44, and calculates a second input torque sensitive transfer torque TLSDI2 from either of the following equations (9) to (13) according to the actual lateral acceleration ($d^2y/dt^2$).

When TCD≦TCD0

$$TLSDI2 = 0 \qquad (9)$$

When $(d^2y/dt^2) \leq (d^2yL/dt^2)$ $$TLSDI2 = TBRL2 \cdot (TCD - TCD0) \quad (10)$$

When $(d^2yL/dt^2) < (d^2y/dt^2) \leq (d^2yM/dt^2)$ $$TLSDI2 = TBRL2 \cdot (TCD-TCD0) \cdot ((d^2yM/dt^2)-(d^2y/dt^2))/((d^2yM/dt^2)-(d^2yL/dt^2)) + TBRM2 \cdot (TCD-TCD0) \cdot ((d^2y/dt^2)-(d^2yL/dt^2))/((d^2yM/dt^2)-(d^2yL/dt^2)) \quad (11)$$

When $(d^2yM/dt^2) < (d^2y/dt^2) \leq (d^2yH/dt^2)$ $$TLSDI2 = TBRM2 \cdot (TCD-TCD0) \cdot ((d^2yH/dt^2)-(d^2y/dt^2))/((d^2yH/dt^2)-(d^2yM/dt^2)) + TBRH2 \cdot (TCD-TCD0) \cdot ((d^2y/dt^2)-(d^2yM/dt^2))/((d^2yH/dt^2)-(d^2yM/dt^2)) \quad (12)$$

When $(d^2y/dt^2) > (d^2yH/dt^2)$ $$TLSDI2 = TBRH2 \cdot (TCD - TCD0) \quad (13)$$

where TCD0 is a constant set in advance, and when less than this input torque value it represents a branch point for input torque for which it can be determined that grip driving will be easy to achieve. Also, TBRL2, TBRM2, TBRH2 are input torque sensitive proportional constants, and set in advance through experimentation etc., then TBRL2>TBRM2>TBRH2, for example, TBRL2=0.2, TBRM2=0.1, TBRH2=0.

Specifically, the second input torque sensitive transfer torque TLSDI2 is larger than TCD0, is set in a region of input torque TCD where the role of the transfer 3 will be required more, and when $(d^2y/dt^2) \leq (d^2yL/dt^2)$ the second input torque sensitive transfer torque TLSDI2 is calculated using input torque sensitive proportional constant TBRL2.

Also, when $(d^2yL/dt^2)<(d^2y/dt^2) \leq (d^2yM/dt^2)$, second input torque sensitive transfer torque TLSDI2 is calculated by interpolating between $(d^2yL/dt^2)$ and $(d^2yM/dt^2)$ using input torque sensitive proportional constants TBRL2 and TBRM2.

Further, when $(d^2yM/dt^2)<(d^2y/dt^2) \leq (d^2yH/dt^2)$, second input torque sensitive transfer torque TLSDI2 is calculated by interpolating between $(d^2yM/dt^2)$ and $(d^2yH/dt^2)$ using input torque sensitive proportional constants TBRM2 and TBRH2.

Also, when $(d^2y/dt^2)>(d^2yH/dt^2)$, second input torque sensitive transfer torque TLSDI2 is calculated using input torque sensitive proportional constant TBRH2.

The input torque sensitive transfer torque calculating section 47 receives as inputs the first input torque sensitive transfer torque TLSDI1 from the first input torque sensitive transfer torque calculating section 45, and the second input torque sensitive transfer torque TLSDI2 from the second input torque sensitive transfer torque calculating section 46. Input torque sensitive transfer torque TLSDI is then calculated using equation (14) below, and output to the transfer torque calculating section 36.

$$TLSDI = TLSDI1 + TLSDI2 \quad (14)$$

Figure 15:
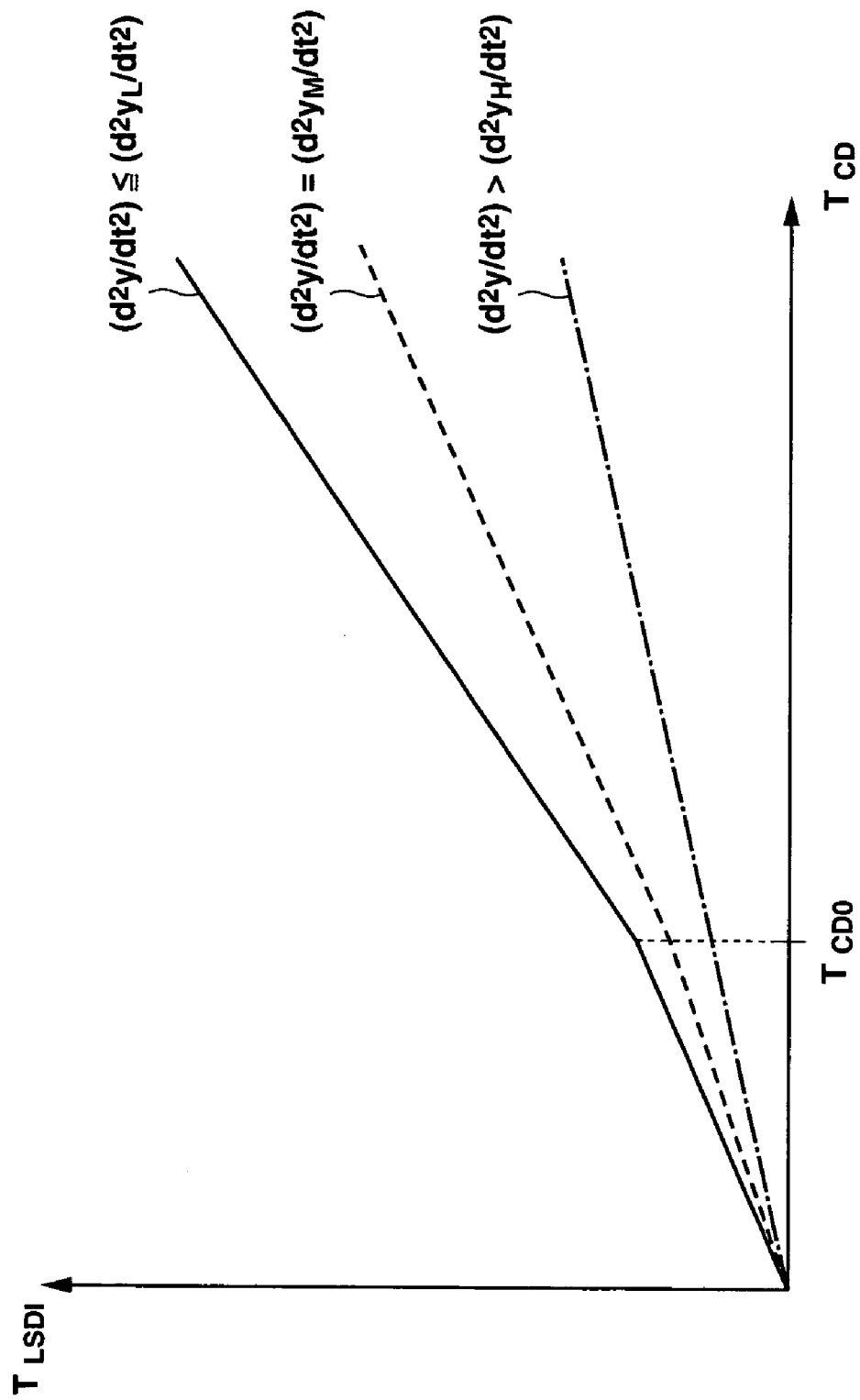
FIG. 15 is a characteristic drawing for input torque sensitive transfer torque.

In this manner, the characteristic of the input torque sensitive transfer torque TLSDI calculated by the first transfer torque calculating section 33 is shown in FIG. 15. With the input torque sensitive transfer torque TLSDI used in this embodiment, when obtaining transfer torque TLSD for the transfer clutch 15, in a region where input torque TCD is large, amount of variation is changed by adding the second input torque sensitive transfer torque TLSDI2, and a larger transfer torque is added so that limited slip differential force is not insufficient when critical traveling at a low μ road. Also, for actual lateral acceleration $(d^2y/dt^2)$ by preparing three torque lines as reference, it is possible to realize suitable travel on low μ road travel and high μ road simply. Incidentally, with this embodiment the branch point TCD0 is set and a region of input torque TCD larger than this is set as a region where input torque sensitive transfer torque TLSDI changes significantly, but it is also possible, for example, to set so that as input torque TCD becomes large the amount of variation of input torque sensitive transfer torque TLSDI becomes large, using quadratic curves etc.

The second transfer torque calculating section 34 receives as inputs steering wheel angle θH from the steering wheel angle sensor 22, actual lateral acceleration $(d^2y/dt^2)$ from the lateral acceleration sensor 23, actual yaw rate γ from the yaw rate sensor 24 and vehicle speed V from the vehicle speed calculating section 32. The second transfer torque calculating section 34 then estimates a yaw moment applied to the vehicle from these input signals and calculates steering angle/yaw rate sensitive transfer torque TLSDP as engaging torque corresponding to this yaw moment, and outputs to the transfer torque calculating section 36.

Figure 4:
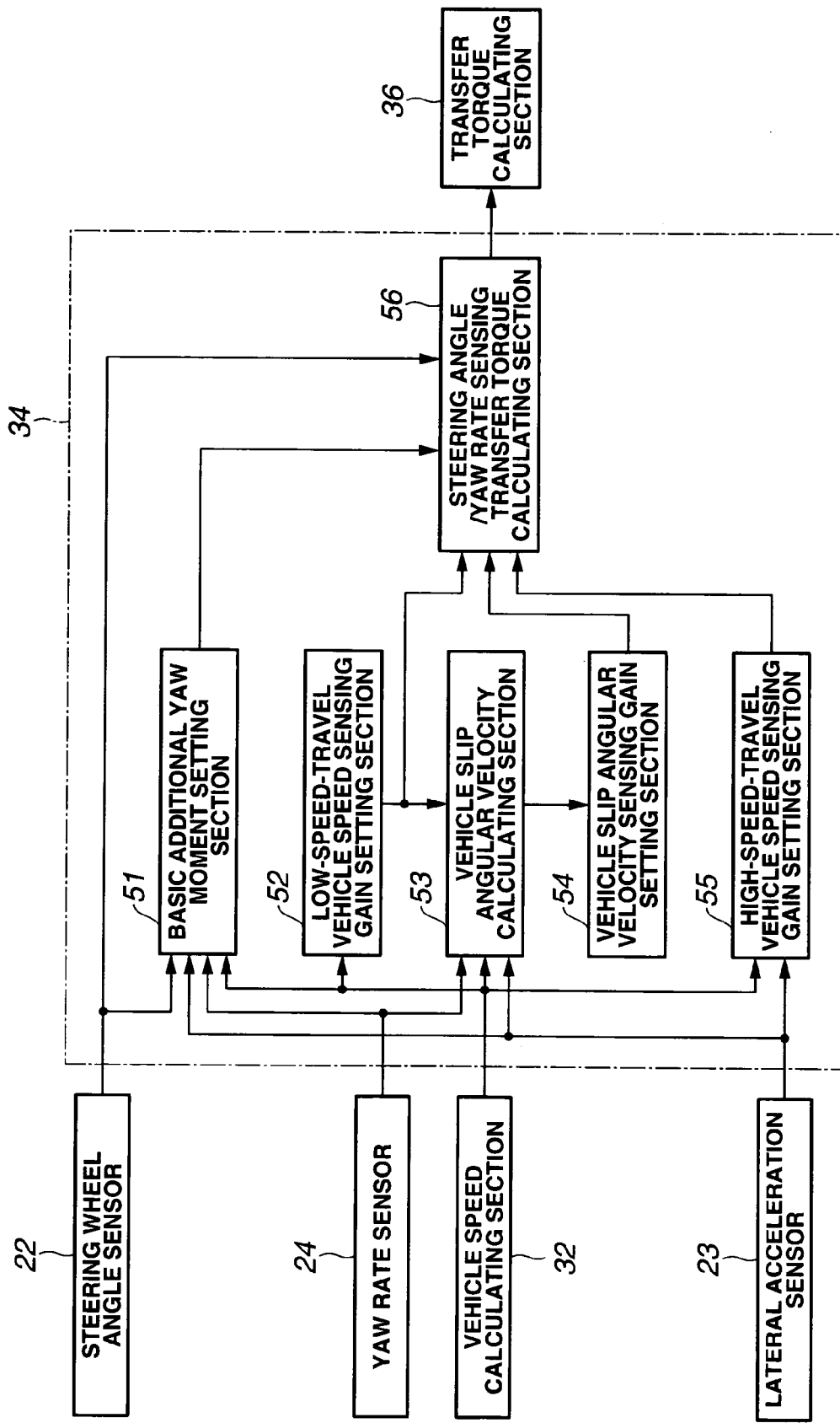
FIG. 4 is a functional block diagram of a second transfer torque calculating section.

Specifically, as shown in FIG. 4, the second transfer torque calculating section 34 mainly comprises a basic additional yaw moment setting section 51, a low-speed-travel vehicle speed sensitive gain setting section 52, a vehicle slip angular velocity calculating section 53, a vehicle slip angular velocity sensitive gain setting section 54, a high-speed-travel vehicle speed sensitive gain setting section 55, and a steering angle/yaw rate sensitive transfer torque calculating section 56.

The basic additional yaw moment setting section 51 receives as inputs steering wheel angle θH from the steering wheel angle sensor 22, $(d^2y/dt^2)$ from the lateral acceleration sensor 23, and actual yaw rate γ from the yaw rate sensor 24. On the basis of these signals the basic additional yaw moment Mzθ is then calculated, and output to the steering angle/yaw rate sensitive transfer torque calculating section 56.

Figure 5:
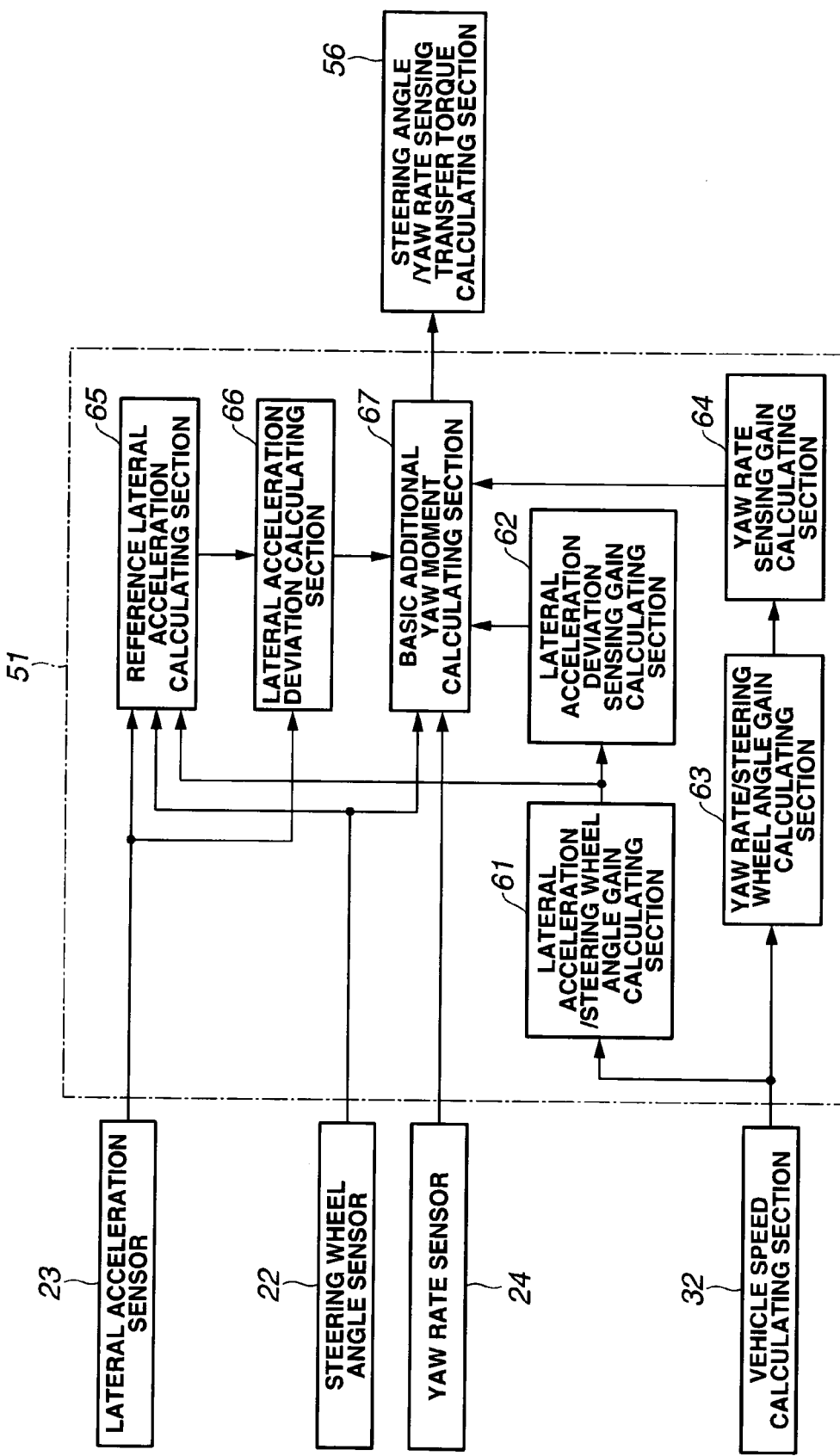
FIG. 5 is a functional block diagram of a basic additional yaw moment setting section.

The configuration of the basic additional yaw moment setting section 51 will be described in the following based on FIG. 5. The basic additional yaw moment setting section 51 is mainly comprised of a lateral acceleration/steering wheel angle gain calculating section 61, a lateral acceleration deviation sensitive gain calculating section 62, a yaw rate/steering wheel angle gain calculating section 63, a yaw rate sensitive gain calculating section 64, a reference lateral acceleration calculating section 65, a lateral acceleration deviation calculating section 66 and a basic additional yaw moment calculating section 67.

The lateral acceleration/steering wheel angle gain calculating section 61 is input with vehicle speed V from the vehicle speed calculating section 32, calculates lateral acceleration/steering wheel angle gain Gy using equation (15) below, and outputs to the lateral acceleration deviation sensitive gain calculating section 62 and the reference lateral acceleration calculating section 65.

$$Gy = (1/(1+A \cdot V^2)) \cdot (V^2/L) \cdot (1/n) \quad (15)$$

where A is stability factor, L is wheelbase and n is steering gear ratio.

The lateral acceleration deviation sensitive gain calculating section 62 is input with lateral acceleration/steering wheel angle gain Gy from the lateral acceleration/steering wheel angle gain calculating section 61. Then, in a state where steering is not completely effective on a road of extremely low μ (γ=0, $(d^2y/dt^2)$=0), lateral acceleration deviation sensitive gain Ky is calculated using equation (16) below, with a criterion being that a value where Mzθ (steady value)=0 is a maximum value, and outputs to the basic additional yaw moment calculating section 67.

$$Ky = K\theta/Gy \quad (16)$$

The yaw rate/steering wheel angle gain calculating section 63 is input with vehicle speed V from the vehicle speed calculating section 32. Yaw rate/steering wheel angle gain Gγ is then calculated using equation (17) below, and outputs to the yaw rate sensitive gain calculating section 64.

$$G\gamma = (1/(1+A \cdot V^2)) \cdot (V/L) \cdot (1/n) \tag{17}$$

The yaw rate sensitive gain calculating section 64 is input with yaw rate/steering wheel angle gain Gγ from the yaw rate/steering wheel angle gain calculating section 63. Then, taking into consideration yaw rate sensitive gain Kγ that becomes Mzθ (steady value)=0 at the time of grip driving (lateral acceleration deviation $(d^2ye/dt^2)$=0), setting is performed using equation (18) below, and outputs to the basic additional yaw moment calculating section 67.

$$K\gamma = K\theta/G\gamma \tag{18}$$

where Kθ is steering angle sensitive gain, and is obtained from the following equation (19).

$$K\theta = (Lf \cdot Kf)/n \tag{19}$$

where Lf is the distance between the front axle and the center of gravity, and Kf is equivalent cornering power of the front axle.

The reference lateral acceleration calculating section 65 receives as input steering wheel angle θH from the steering wheel angle sensor 22, actual lateral acceleration $(d^2y/dt^2)$ from the lateral acceleration sensor 23, and lateral acceleration/steering wheel angle gain Gy from the lateral acceleration/steering wheel angle gain calculating section 61. Reference lateral acceleration $(d^2yr/dt^2)$ representing a relationship between estimated lateral acceleration and actual lateral acceleration is then calculated using the following equation (20) based on a linear vehicle driving model from the driving conditions of the vehicle.

$$(d^2yr/dt^2) = (1/(1+Ty \cdot s)) \cdot (d^2yss/dt^2) \tag{20}$$

where s is a differential operator, Ty is a primary delay time constant for lateral acceleration, $(d^2yss/dt^2)$ is a signed reference lateral acceleration not taking account of delay, and this signed reference lateral acceleration not taking account of delay $(d^2yss/dt^2)$ is set in the following manner.

When θH≧0

$$(d^2yss/dt^2) = (d^2ysm/dt^2) \tag{21}$$

When θH<0

$$(d^2yss/dt^2) = -(d^2ysm/dt^2) \tag{22}$$

where $(d^2ysm/dt^2)$ is unsigned reference lateral acceleration that will be saturated by $(d^2yx/dt^2)$ which will be described later.

Specifically, $(d^2yx/dt^2)$ is pseudo lateral acceleration causing saturation of the reference lateral acceleration, and is calculated using equation (23) or equation (24) below.

When $(d^2y/dt^2)$<0

$$(d^2yx/dt^2) = Gy \cdot \theta HMax \cdot ((10-(d^2y/dt^2))/10) + (d^2y/dt^2) \tag{23}$$

Figure 16:
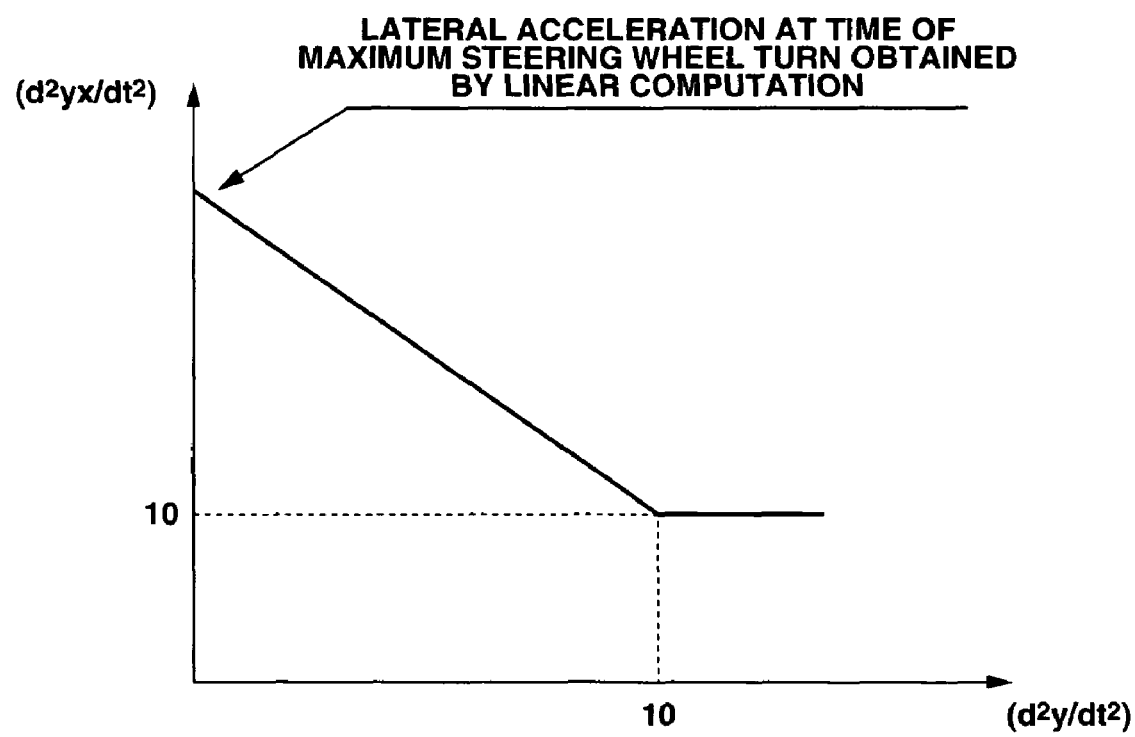
FIG. 16 is a characteristic explanatory drawing for simulated lateral acceleration causing saturation of reference lateral acceleration for actual lateral acceleration.

When $(d^2y/dt^2)$≧0

$$(d^2yx/dt^2) = 10 \tag{24}$$

where θHMax is maximum steering angle. If this pseudo lateral acceleration $(d^2yx/dt^2)$ causing saturation of reference lateral acceleration set using equation (23) or equation (24) is shown as a characteristic diagram, it will be as shown in FIG. 16, and with this embodiment, for example, saturation occurs at 10 m/s².

Also, unsigned lateral acceleration linearly calculated for steering wheel angle is made as $(d^2ysl/dt^2)$, and calculated using the following equation (25).

$$(d^2ysl/dt^2) = Gy \cdot |\theta H| \tag{25}$$

If a difference of $(d^2yx/dt^2)$ from $(d^2ysl/dt^2)$ is made as $(d^2yd/dt^2)(=(d^2ysl/dt^2)-(d^2yx/dt^2))$, unsigned reference lateral acceleration $(d^2ysm/dt^2)$ saturated by $(d^2yx/dt^2)$ is calculated using the following equation (26) or equation (27).

When $(d^2yd/dt^2)$>0

$$(d^2ysm/dt^2) = (d^2ysl/dt^2) - (d^2yd/dt^2) \tag{26}$$

When $(d^2yd/dt^2)$≦0

$$(d^2ysm/dt^2) = (d^2ysl/dt^2) \tag{27}$$

Figure 17:
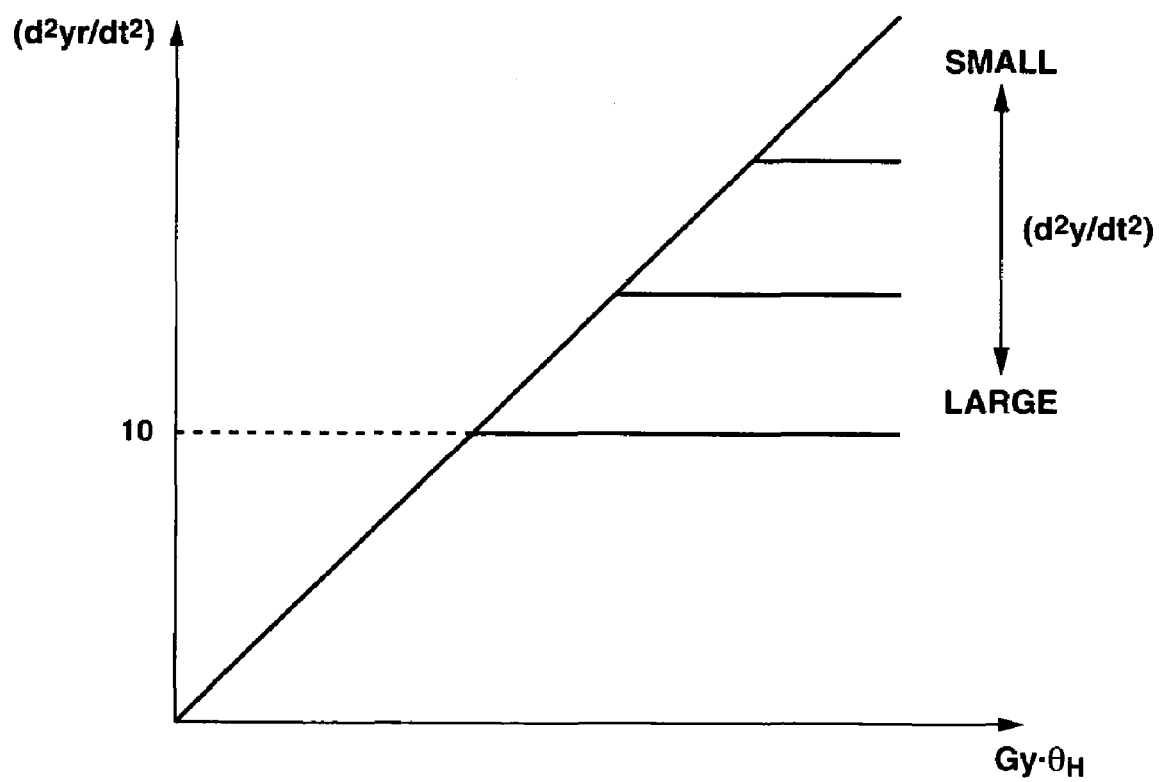
FIG. 17 is a characteristic explanatory drawing for reference lateral acceleration for lateral acceleration/calculated values of steering wheel angle gain multiplicated by steering wheel angle.

In this way, a characteristic for reference lateral acceleration $(d^2yr/dt^2)$ representing a relationship between lateral acceleration estimated based on a linear vehicle driving model from the set driving conditions of the vehicle and actual lateral acceleration is as shown in FIG. 17, and with respect to the reference lateral acceleration $(d^2yr/dt^2)$, in a relationship to (Gy·θH), when road surface μ is high and actual lateral acceleration $(d^2y/dt^2)$ is large, reference lateral acceleration is controlled to a small value, while conversely when road surface μ is low and actual lateral acceleration $(d^2y/dt^2)$ is small, it is set so as to be large value. By setting reference lateral acceleration $(d^2yr/dt^2)$ in this way, when calculating basic additional yaw moment Mzθ, containing reference lateral acceleration $(d^2yr/dt^2)$, in the basic additional yaw moment calculating section 67, which will be described later, an excessive turning moment when turning severely on a low μ road is prevented.

The lateral acceleration deviation calculating section 66 is input with actual lateral acceleration $(d^2y/dt^2)$ from the lateral acceleration sensor 23, and is input with reference lateral acceleration $(d^2yr/dt^2)$ from the reference lateral acceleration calculating section 65. Lateral acceleration deviation $(d^2ye/dt^2)$ is then calculated using equation (28) below, and outputs to the basic additional yaw moment calculating section 67.

$$(d^2ye/dt^2) = (d^2y/dt^2) - (d^2yr/dt^2) \tag{28}$$

The basic additional yaw moment calculating section 67 is input with steering wheel angle θH from the steering wheel angle sensor 22, actual yaw rate γ from the yaw rate sensor 24, lateral acceleration deviation sensitive gain Ky from the lateral acceleration deviation sensitive gain calculating section 62, yaw rate sensitive gain Kγ from the yaw rate sensitive gain calculating section 64, and lateral acceleration deviation $(d^2ye/dt^2)$ from the lateral acceleration deviation calculating section 66.

Basic additional yaw moment Mzθ is then calculated from equation (29) below, and outputs to the steering angle/yaw rate sensitive transfer torque calculating section 56.

$$Mz\theta = -K\gamma \cdot \gamma + Ky \cdot (d^2ye/dt^2) + K\theta \cdot \theta H \tag{29}$$

Specifically, as shown in equation (29), the term −Kγ·γ is yaw moment sensed on yaw rateγ, the term Kθ·θH is yaw moment sensed on steering angle θH, and the term Ky·$(d^2ye/dt^2)$ is a corrected value for yaw moment. Therefore, in the case of steering with a large lateral acceleration $(d^2y/dt^2)$ on a high μ road, the additional yaw moment Mzθ is also a large value and it is possible to improve driving performance. On the other hand, with travel on a low μ road, with respect to additional yaw moment Mzθ, cornering becomes good because additional yaw moment Mzθ is reduced by the correction operation described above, and stable traveling performance is obtained.

Returning to FIG. 4, the low-speed-travel vehicle speed sensitive gain setting section 52 is input with vehicle speed V from the vehicle speed calculating section 32. Then, referring to the map shown in FIG. 18 for example, low-speed-travel vehicle speed sensitive gain KVv1 is set, and outputs to the vehicle slip angular velocity calculating section 53 and the steering angle/yaw rate sensitive transfer torque calculating section 56.

Figure 18:
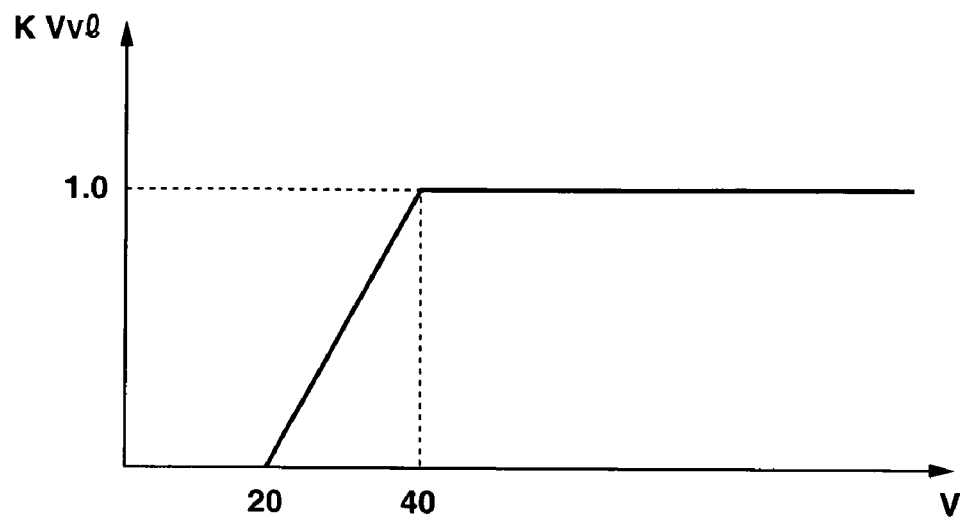
FIG. 18 is a characteristic explanatory drawing for vehicle speed sensitive gain when running at low speed.

As is clear from FIG. 18, this low-speed-travel vehicle speed sensitive gain KVv1 is set low in order to avoid unnecessary additional yaw moment MVzθ at extremely low speed. In particular, at 20 km/h or less, low-speed-travel vehicle speed sensitive gain KVv1 is set to 0, so that controlled additional yaw moment MVzθ does not act.

The vehicle slip angular velocity calculating section 53 receives as inputs actual lateral acceleration ($d^2y/dt^2$) from the lateral acceleration sensor 23, actual yaw rate γ from the yaw rate sensor 24, vehicle speed V from the vehicle speed calculating section 32, and low-speed-travel vehicle speed sensitive gain KVv1 from the low-speed-travel vehicle speed sensitive gain setting section 52.

Vehicle slip angular velocity (dβ/dt) is calculated using equation (30) below, and the vehicle slip angular velocity calculating section 53 outputs to the vehicle slip angular velocity sensitive gain setting section 54.

$$(d\beta/dt) = KVv1 \cdot |((d^2y/dt^2)/V) - \gamma| \tag{30}$$

The vehicle slip angular velocity sensitive gain setting section 54 is input with vehicle slip angular velocity (dβ/dt) from the vehicle slip angular velocity calculating section 53. Then, basic vehicle slip angular velocity sensitive gain KV(dβ/dt)0 and return gradient limited vehicle slip angular velocity sensitive gain KV(dβ/dt)L are calculated, and in a range not exceeding 1.0 the smaller of the two is set as vehicle slip angular velocity sensitive gain KV(dβ/dt) and outputs to the steering angle/yaw rate sensitive transfer torque calculating section 56.

Figure 19:
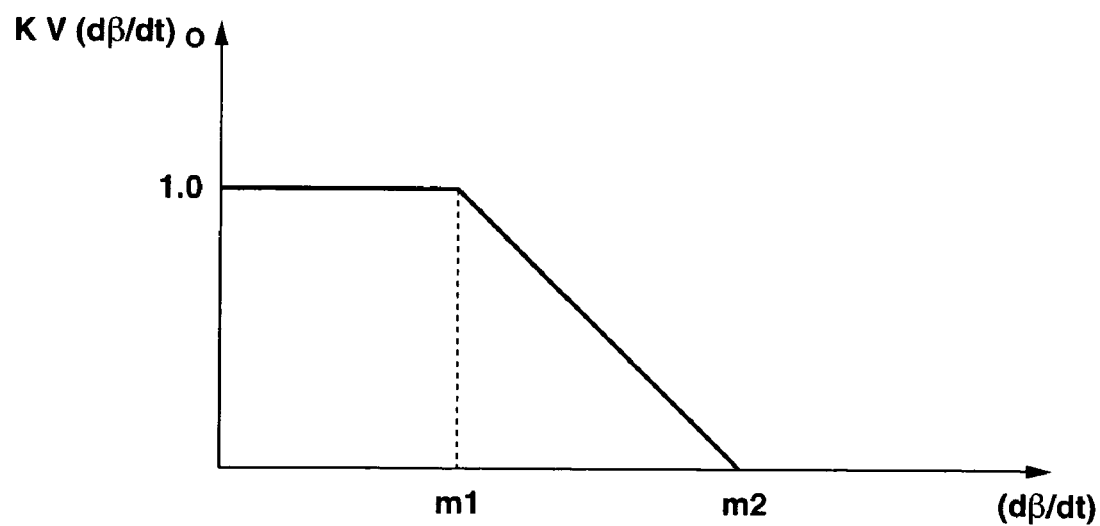
FIG. 19 is a characteristic explanatory drawing of basic vehicle slip angular velocity sensitive gain with respect to vehicle slip angular velocity.

Specifically, the basic vehicle slip angular velocity sensitive gain KV(dβ/dt)0 is set by referring to the map shown in FIG. 19, for example. As will be clear from FIG. 19, the basic vehicle slip angular velocity sensitive gain KV(dβ/dt)0 is set in order to control excessive cornering in a critical region where vehicle slip angular velocity (dβ/dt) is large, and in particular, with a vehicle slip angular velocity (dβ/dt) of m2 or greater is set to 0, and is set so that additional yaw moment MVzθ due to control does not act.

Also, return gradient limited vehicle slip angular velocity sensitive gain KV(dβ/dt)L is calculated using equation (31) below.

$$KV(d\beta/dt)L(k) = KV(d\beta/dt)L(k-1) + \Delta KV(d\beta/dt) \cdot \Delta t \tag{31}$$

where KV(dβ/dt)L(k) is return gradient limited vehicle slip angular velocity sensitive gain for this time, KV(dβ/dt)(k−1) is vehicle slip angular velocity sensitive gain for the previous time, ΔKV(dβ/dt) is vehicle slip angular velocity sensitive gain return gradient (a constant, for example 0.3), and Δt is calculation period.

Figure 20:
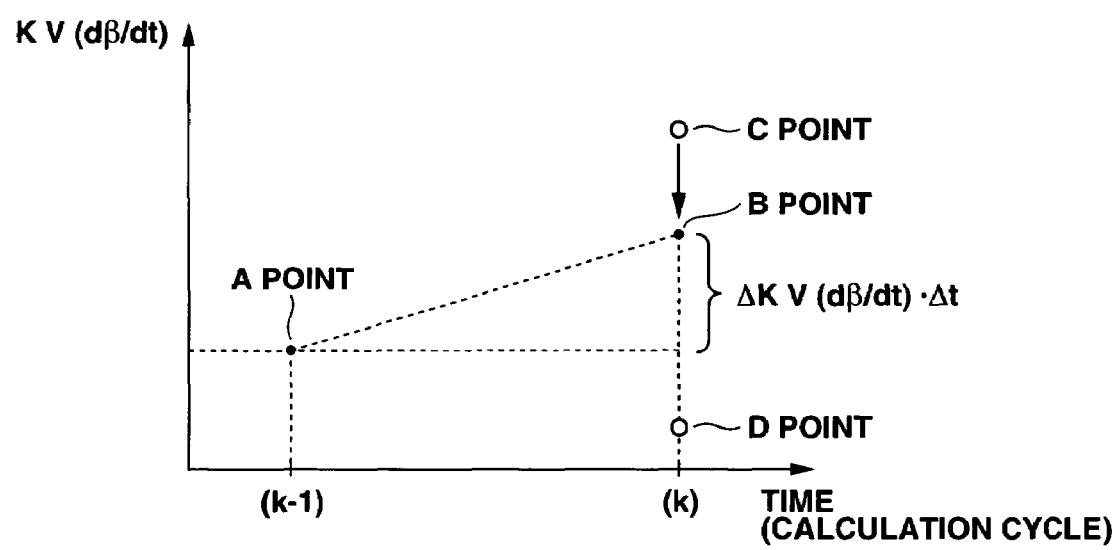
FIG. 20 is an explanatory drawing of limitation due to vehicle slip angular velocity sensitive gain with return gradient limit.

With respect to the return gradient limited vehicle slip angular velocity sensitive gain KV(dβ/dt)L expressed by equation (31) above, with the meaning of FIG. 20, if vehicle slip angular velocity sensitive gain KV(dβ/dt)(k−1) for the previous time is assumed to be point A, the return gradient limited vehicle slip angular velocity sensitive gain KV(dβ/dt) L(k) for this time becomes point B. Because a value that is smaller compared to the basic vehicle slip angular velocity sensitive gain KV(dβ/dt)0 is set as the vehicle slip angular velocity sensitive gain KV(dβ/dt), in cases such as where basic vehicle slip angular velocity sensitive gain KV(dβ/dt)0 is at point C, return gradient limit vehicle slip angular velocity sensitive gain KV(dβ/dt)L(k) for this time is set as the vehicle slip angular velocity sensitive gain KV(dβ/dt). Conversely, in cases such as where basic vehicle slip angular velocity sensitive gain KV(dβ/dt)0 is at point D, the basic vehicle slip angular velocity sensitive gain KV(dβ/dt)0 is set as vehicle slip angular velocity sensitive gain KV(dβ/dt). Specifically, return gradient limited vehicle slip angular velocity sensitive gain KV(dβ/dt)L(k) for this time is set as a limited value.

Figure 21:
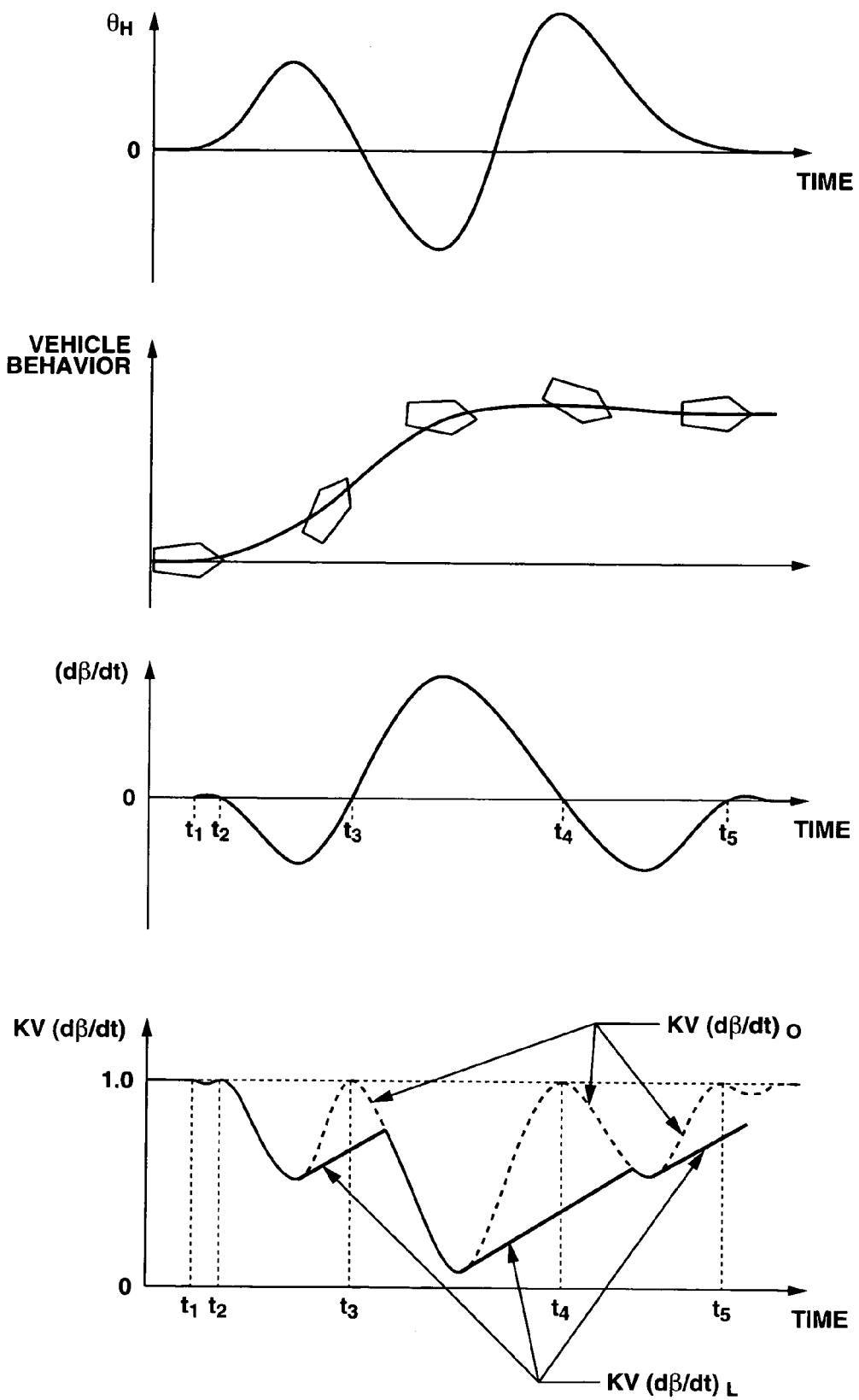
FIG. 21 is a timing chart showing one example of vehicle slip angular velocity sensitive gain to be set.

For example, as shown in FIG. 21, consider a case where a driver steers to the left, then to the right, and after that performs counter steering.

At that time, as shown in FIG. 21, vehicle slip angular velocity (dβ/dt) sequentially takes values that are negative-positive-negative, but in a transitional state where the sign is switching like this, the vehicle slip angular velocity (dβ/dt) temporarily generates moment with a small or zero value. Under such conditions, if additional yaw moment MVzθ is inadvertently set using only the basic vehicle slip angular velocity sensitive gain KV(dβ/dt)0, transfer torque TLSD becomes an unfavorable zero or small value regardless of the vehicle being in an unstable state (a part of the dotted line in the drawing of KV(dβ/dt) in FIG. 21). Accordingly, by performing control with return gradient limited vehicle slip angular velocity sensitive gain KV(dβ/dt)L taking into consideration above transitional state, unnecessary addition of a turning moment in unstable or transitional states of the vehicle is reliably prevented, and it is possible to carry out front and rear drive power distribution with good precision and in a stable manner.

The high-speed-travel vehicle speed sensitive gain setting section 55 is input with actual lateral acceleration ($d^2y/dt^2$) from the lateral acceleration sensor 23, and is input with vehicle speed V from the vehicle speed calculating section 32.

Then, first of all a vehicle speed sensitive term KVvhv of the high-speed-travel vehicle speed sensitive gain KVvh is set using the following equation (32), or equation (33) or equation (34).

When $(3.6 \cdot V) \leq 60$ $$KVvhv = 1 \tag{32}$$

When $60 < (3.6 \cdot V) < 120$ $$KVvhv = 1 - (((3.6 \cdot V) - 60)/(120 - 60)) \tag{33}$$

When $(3.6 \cdot V) \geq 120$ $$KVvhv = 0 \tag{34}$$

High-speed-travel vehicle speed sensitive gain KVvh is set on the following equation (35), or equation (36) or equation (37), based on the above mentioned vehicle speed sensitive term KVvhv of high-speed-travel vehicle speed sensitive gain KVvh.

When $|d^2y/dt^2| \leq 3$ $$KVvh = KVvhv \tag{35}$$

When $3 < |d^2y/dt^2| < 9$ $$KVvh = 1 \cdot ((|d^2y/dt^2| - 3)/(9-3)) + KVvhv \cdot ((9 - |d^2y/dt^2|)/(9-3)) \tag{36}$$

When $|d^2y/dt^2| > 9$ $$KVvh = 1 \tag{37}$$

Figure 22:
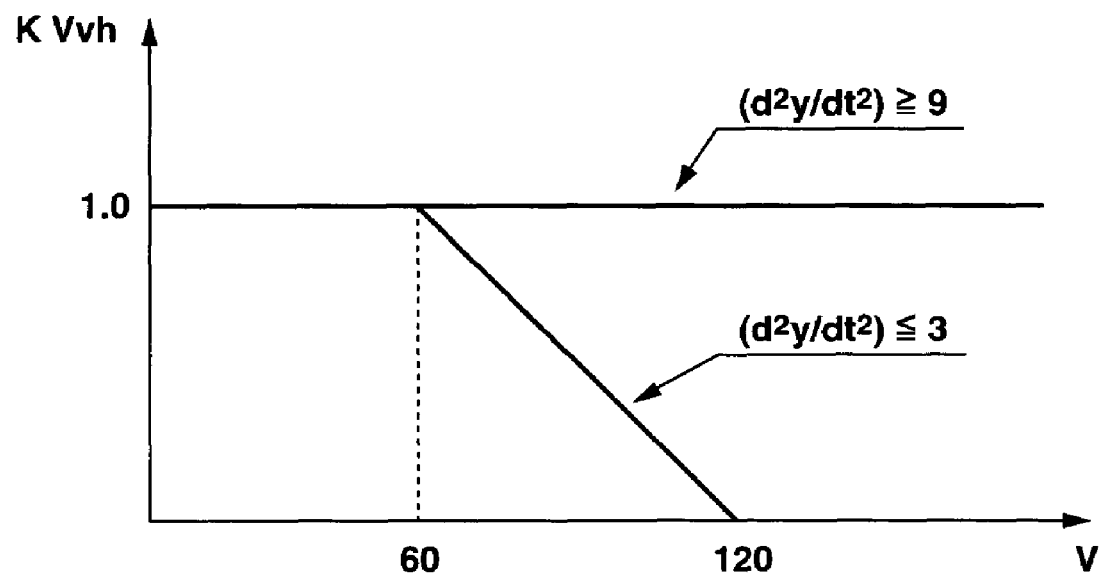
FIG. 22 is a characteristic explanatory drawing for vehicle speed sensitive gain when running at high speed, with respect to vehicle speed and actual lateral acceleration.

A characteristic drawing for the high-speed-travel vehicle speed sensitive gain KVvh acquired using the above mentioned equations (35) to (37) is shown in FIG. 22. Specifically, when an absolute value of actual lateral acceleration in high speed travel $|d^2y/dt^2|$ is low ($|d^2y/dt^2|\leq 3$), and there is a possibility of low μ road travel, in order to suppress excessive cornering the high-speed-travel vehicle speed sensitive gain KVvh is set to a small value.

The steering wheel angle/yaw rate sensitive transfer torque calculating section 56 is input with steering wheel angle θH from the steering wheel angle sensor 22, basic additional yaw moment Mzθ from the basic additional yaw moment setting section 51, low-speed-travel vehicle speed sensitive gain KVvl from the low-speed-travel vehicle speed sensitive gain setting section 52, vehicle slip angular velocity sensitive gain KV(dβ/dt) from the vehicle slip angular velocity sensitive gain setting section 54, and high-speed-travel vehicle speed sensitive gain KVvh from the high-speed-travel vehicle speed sensitive gain setting section 55.

Additional yaw moment MVzθ is then calculated from equation (38) below, steering wheel angle/yaw rate sensitive transfer torque TLSDP is calculated from equation (39) or equation (40) below, and the two values are output to the transfer torque calculating section 36.

$$MVz\theta = KVz\theta \cdot KVv1 \cdot KVvh \cdot KV(d\beta/dt) \cdot Mz\theta \quad (38)$$

where KVzθ is gain deciding an assist amount, and is a constant (for example 1).

When θH≧0

$$TLSDP = -KLSDP \cdot MVz\theta \quad (39)$$

When θH<0

$$TLSDP = KLSDP \cdot Mvz\theta \quad (40)$$

where KLSDP is a conversion factor.

On the other hand, returning to FIG. 2, the third transfer torque calculating section 35 is provided as tack-in prevention torque calculating means, and receives as inputs actual lateral acceleration ($d^2y/dt^2$) from the lateral acceleration sensor 23, accelerator opening degree θACC from the accelerator opening degree sensor 25, and vehicle speed V from the vehicle speed calculating section 32.

Then, when the following conditions are satisfied, tack-in prevention transfer torque TLSDD to be added is calculated using equation (41) below, and output until the following releasing conditions are established.

Here, execution conditions for calculating and outputting tack-in prevention transfer torque TLSDD are when accelerator opening degree this time is 0, and accelerator opening degree the previous time was larger than 0, and there is a high speed turning state (for example, ($d^2y/dt^2$)>3, and V>40 km/h).

Also, the releasing conditions are when accelerator opening degree this time is larger than zero or V≦40 km/h.

$$TLSDD = TLSDD0 \cdot ((V-VDoff)/(Vc-VDoff)) \cdot (((d^2y/dt^2)-(d^2y/dt^2)Doff)/((d^2y/dt^2)c-(d^2y/dt^2)Doff)) \quad (41)$$

where TLSDD0 is a reference value obtained in advance by experimentation, and is a reference value capable of controlling tack-in when traveling such that with vehicle speed at Vc, lateral acceleration becomes ($d^2y/dt^2$)c. Also, VDoff and ($d^2y/dt^2$)Doff are respectively vehicle speed and lateral acceleration for releasing tack-in control. Incidentally, equation (41) is only one example of an equation for obtaining tack-in prevention transfer torque TLSDD, and it is also possible to have other equations.

In this manner, in the present embodiment, it is possible to effectively prevent a tack-in phenomenon using feed forward control in response to vehicle speed V and lateral acceleration ($d^2y/dt^2$) utilizing the tack-in prevention transfer torque TLSDD from the third transfer torque calculating section 35.

The tack-in prevention transfer torque TLSDD calculated by the third transfer torque calculating section 35 is then output to the transfer torque calculating section 36.

The transfer torque calculating section 36 receives as inputs the input torque sensitive transfer torque TLSDI from the first transfer torque calculating section 33, and the steering angle/yaw rate sensitive transfer torque TLSDI from the second transfer torque calculating section 34, and the tack-in prevention transfer torque TLSDD from the third transfer torque calculating section 35. Transfer torque TLSD is then calculated using equation (42) below, and output to the transfer clutch drive section 31.

$$TLSD = TLSDI + TLSDP + TLSDD \quad (42)$$

Next, drive power distribution control in the drive power distribution control section 30 having the above described configuration will be described with the flowcharts of FIG. 6 to FIG. 14.

Figure 6:
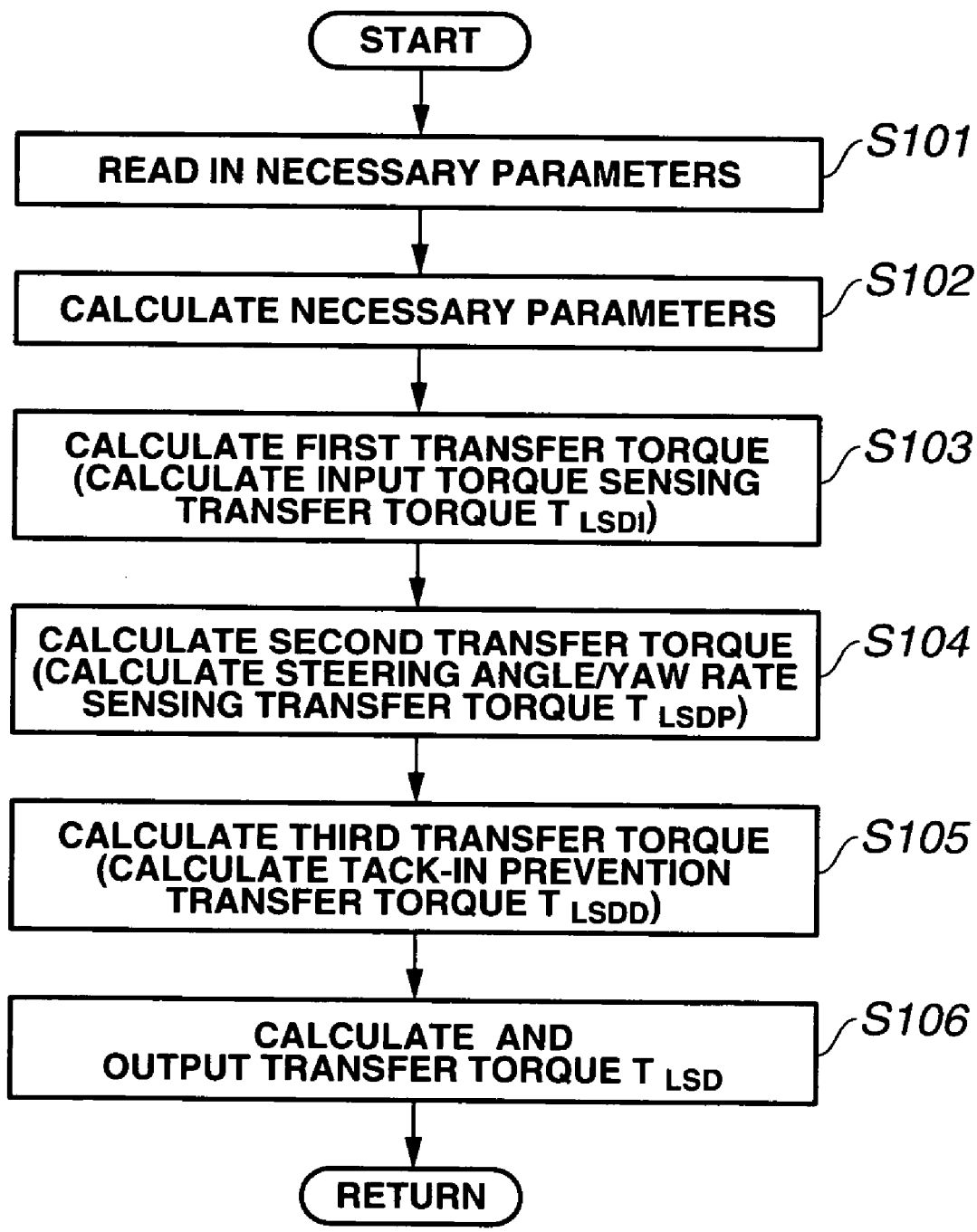
FIG. 6 is a flow chart of a drive distribution control program.

The flowchart of FIG. 6 shows a drive power distribution control program, and first of all, in step (hereafter abbreviated to "S") 101 necessary parameters are read in, namely vehicle wheel speeds ωfl, ωfr, ωrl, ωrr from the wheel speed sensors 21*fl*, 21*fr*, 21*rl*, 21*rr*, steering wheel angle θH from the steering wheel sensor 22, actual lateral acceleration ($d^2y/dt^2$) from the lateral acceleration sensor 23, actual yaw rate γ from the yaw rate sensor 24, accelerator opening degree θACC from the accelerator opening degree sensor 25, and engine speed Ne from the engine speed sensor 26.

Next, processing advances to S102, and necessary parameters, namely vehicle speed V etc., are calculated by the vehicle speed calculating section 32 etc.

Processing then advances to S103 where the first transfer torque is calculated, and the input torque sensitive transfer torque TLSDI is calculated using the first transfer torque calculating section 33. This calculation of the input torque sensitive transfer torque TLSDI will be explained later with the flowchart of FIG. 7.

Next, processing advances to S104 where the second transfer torque is calculated, and the steering angle/yaw rate sensitive transfer torque TLSDP is calculated using the second transfer torque calculating section 34. This calculation of the steering angle/yaw rate sensitive transfer torque TLSDP will be explained later with the flowchart of FIG. 11.

Processing then advances to S105 where the third transfer torque is calculated, and the tack-in prevention transfer torque TLSDD is calculated using the third transfer torque calculating section 34. This calculation of the tack-in prevention transfer torque TLSDD will be explained later with the flowchart of FIG. 14.

Next, processing advances to S106 where transfer torque TLSD is calculated by the transfer torque calculating section 36 using the previously mentioned equation (42), this value is output to the transfer clutch drive section 31, and the program exits.

Figure 7:
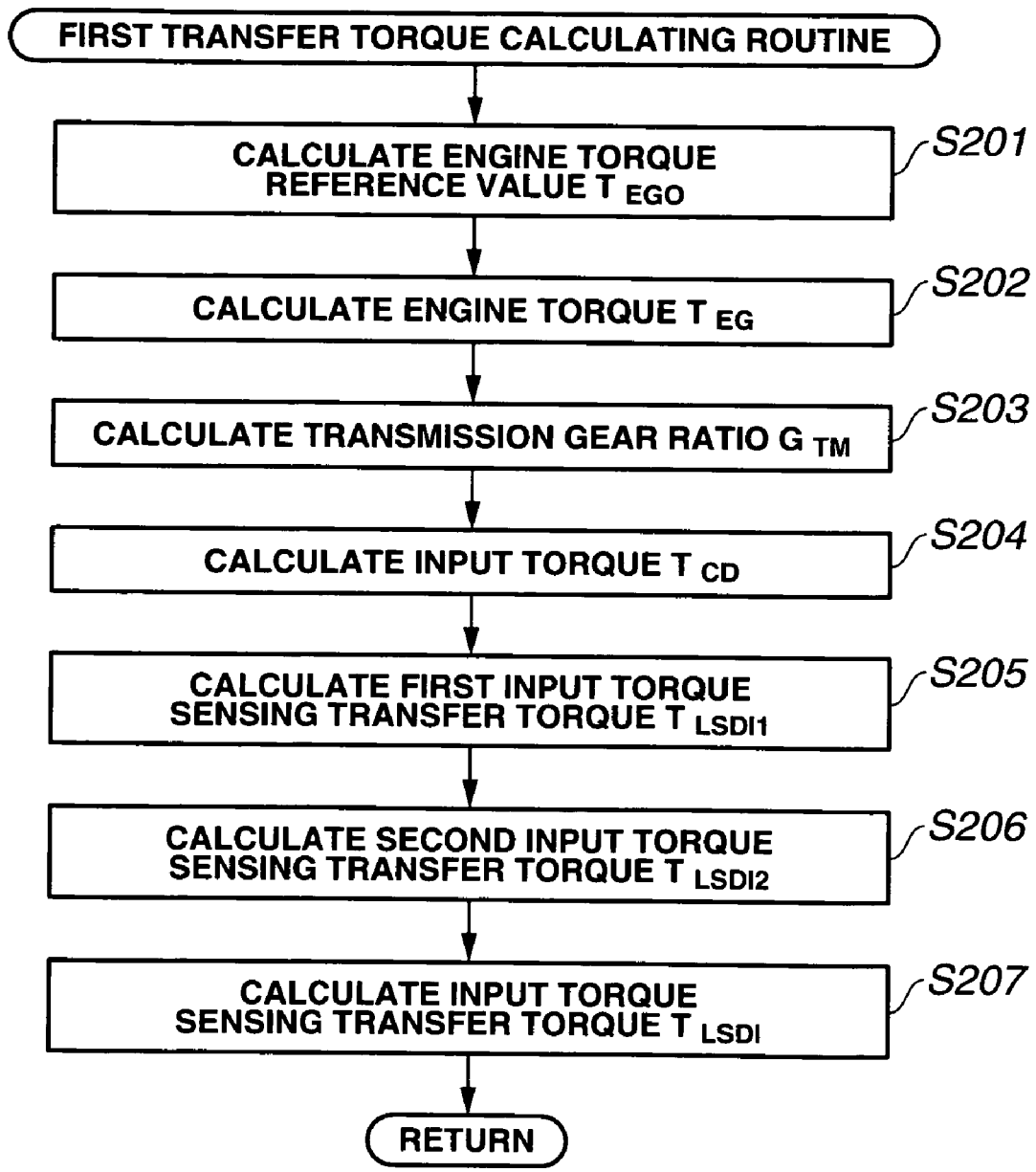
FIG. 7 is a flowchart of a first transfer torque calculating routine.

FIG. 7 shows a first transfer torque calculating routine executed by the first transfer torque calculating section 33, and first, in S201, the engine torque reference value calculating section 41 obtains engine torque by referencing an engine characteristic map that has been set in advance, and calculates this engine torque as engine torque reference value TEG0.

Processing then advances to S202, where the engine torque calculating section 42 calculates engine torque TEG from previously mentioned equation (1) or equation (2). Incidentally, this calculation of the engine torque TEG will be explained later with the flowchart of FIG. 8.

Next, processing advances to S203, where the transmission gear ratio calculating section 43 calculates transmission gear ratio GTM from previously mentioned equation (3). Next, processing advances to S204, where the input torque calculating section 44 calculates input torque TCD from previously mentioned equation (4).

Processing then advances to S205, where the first input torque sensitive transfer torque calculating section 45 calculates first input torque sensitive transfer torque TLSDI1 from either of the above described equations (5) to (8). This calculation of the first input torque sensitive transfer torque TLSDI1 will be explained later with the flowchart of FIG. 9.

Processing then advances to S206, where the second input torque sensitive transfer torque calculating section 46 calculates second input torque sensitive transfer torque TLSDI2 from either of the above described equations (9) to (13). This calculation of the second input torque sensitive transfer torque TLSDI2 will be explained later with the flowchart of FIG. 10.

Next, processing advances to S207 where the input torque sensitive transfer torque calculating section 47 calculates input torque sensitive transfer torque TLSDI using the previously mentioned equation (14), and the routine exits.

Figure 8:
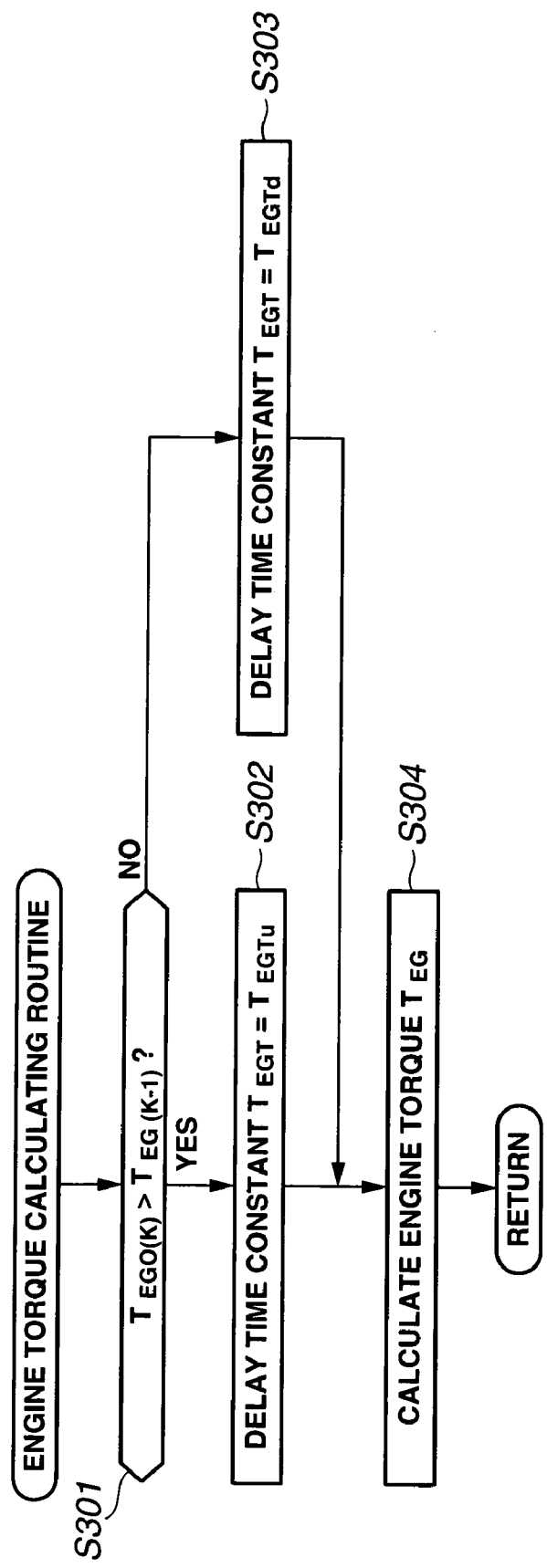
FIG. 8 is a flowchart of an engine torque calculating routine.

FIG. 8 shows an engine torque calculating routine executed by the engine torque calculating section 42 in S202 above, and first of all in S301 a comparison is made of the engine torque reference value this time TEG0($k$) and the engine torque the previous time TEG(k−1).

As a result of the comparison of S301, when TEG0($k$)>TEG(k−1) and it is determined that engine torque is increasing, processing advances to S302 where delay time constant TEGT is set to a delay time constant to the engine torque increasing side TEGTu (for example, 0.5), processing advances to S304 where the engine torque TEG is calculated from above described equation (1) using this engine torque increasing side delay time constant TEGTu, and the routine exits.

As a result of the comparison of S301, when TEG0($k$)≦TEG(k−1) and it is determined that engine torque is decreasing, processing advances to S303 where delay time constant TEGT is set to a delay time constant to the engine torque decreasing side TEGTd (for example, 0.2), processing advances to S304 where the engine torque TEG is calculated from above mentioned equation (2) using this engine torque decreasing side delay time constant TEGTd, and the routine exits.

Figure 9:
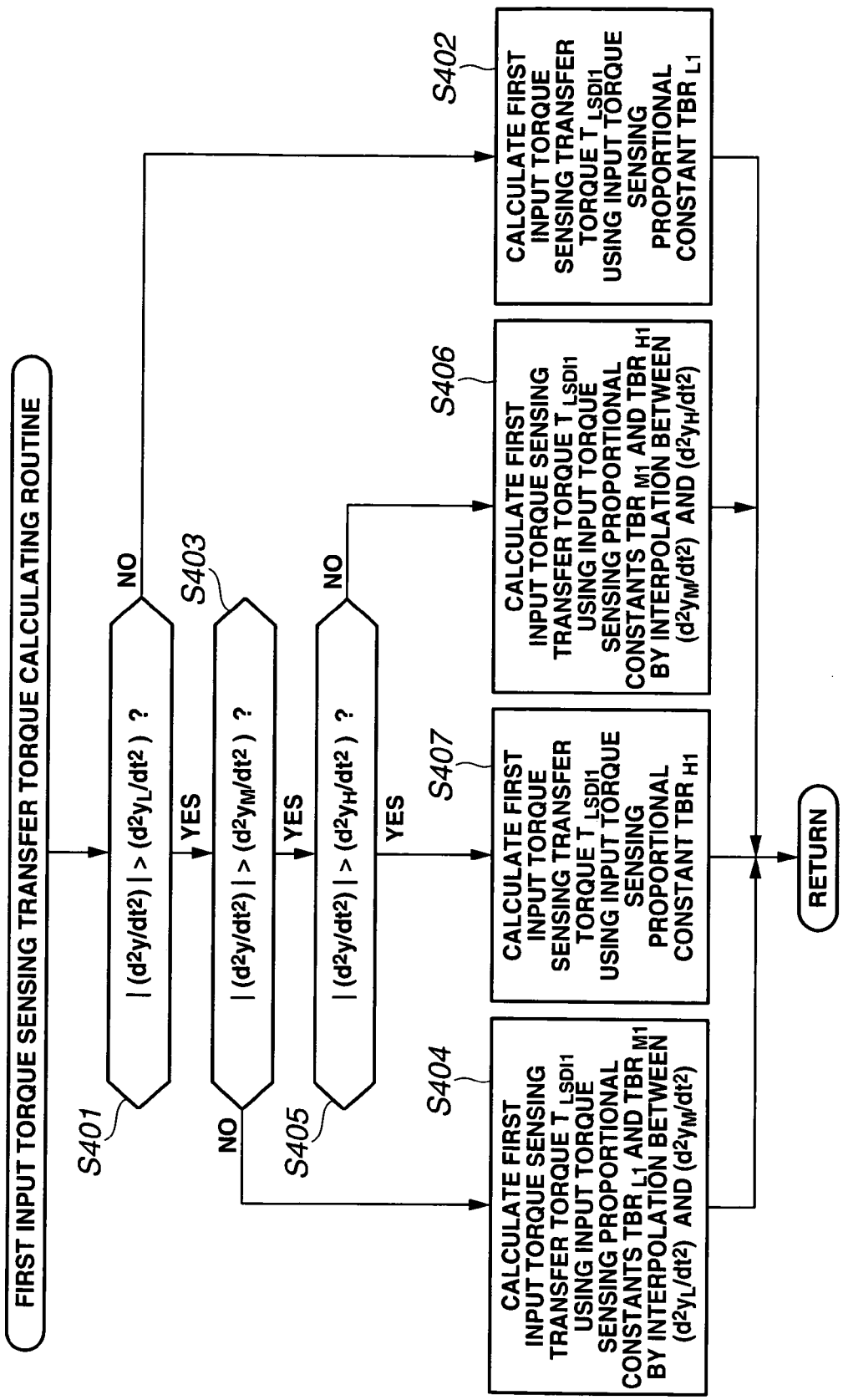
FIG. 9 is a flowchart of a first input torque sensitive transfer torque calculating routine.

FIG. 9 shows a first input torque sensitive transfer torque calculating routine executed by the first input torque sensitive transfer torque calculating section 45 in S205 above, and first of all, in S401 comparison is made between actual lateral acceleration ($d^2y/dt^2$) and a constant ($d^2yL/dt^2$).

When the result of the comparison of S401 is that the actual lateral acceleration ($d^2y/dt^2$) is less than or equal to the constant ($d^2yL/dt^2$) (($d^2y/dt^2$)≦(($d^2yL/dt^2$)), processing advances to S402 where the first input torque sensitive transfer torque TLSDI1 is calculated from equation (5) above using the input torque sensitive proportional constant TBRL1, and the routine exits.

Also, if the result of comparison in S401 is that actual lateral acceleration ($d^2y/dt^2$) is a greater value than the constant ($d^2yL/dt^2$) (($d^2y/dt^2$)>($d^2yL/dt^2$)), processing advances to S403 where comparison is made between actual lateral acceleration ($d^2y/dt^2$) and the constant ($d^2yM/dt^2$) (>($d^2yL/dt^2$)).

When the result of the comparison of S403 is that the actual lateral acceleration ($d^2y/dt^2$) is less than or equal to the constant ($d^2yM/dt^2$) (($d^2yL/dt^2$)<($d^2y/dt^2$)≦($d^2yM/dt^2$)) processing advances to S404 where the first input torque sensitive transfer torque TLSDI1 is calculated from equation (6) above by interpolation between ($d^2yL/dt^2$) and ($d^2yM/dt^2$) using the input torque sensitive proportional constants TBRL1 and TBRM1, and the routine exits.

Also, if the result of comparison in S403 is that actual lateral acceleration ($d^2y/dt^2$) is a greater value than the constant ($d^2yM/dt^2$) (($d^2y/dt^2$)>($d^2yM/dt^2$)), processing advances to S405 where comparison is made between actual lateral acceleration ($d^2y/dt^2$) and the constant ($d^2yH/dt^2$)(>($d^2yM/dt^2$)).

When the result of the comparison of S405 is that the actual lateral acceleration ($d^2y/dt^2$) is less than or equal to the constant ($d^2yH/dt^2$)(($d^2yM/dt^2$)<($d^2y/dt^2$)≦($d^2yH/dt^2$)) processing advances to S406 where the first input torque sensitive transfer torque TLSDI1 is calculated from equation (7) above using the input torque sensitive proportional constants TBRM1 and TBRH1 by interpolation between ($d^2yM/dt^2$) and ($d^2yH/dt^2$), and the routine exits.

Also, when the result of the comparison of S405 is that the actual lateral acceleration ($d^2y/dt^2$) is a larger value than the constant ($d^2yH/dt^2$) (($d^2y/dt^2$)>($d^2yH/dt^2$)), processing advances to S407 where the first input torque sensitive transfer torque TLSDI1 is calculated from equation (8) above using the input torque sensitive proportional constant TBRH1, and the routine exits.

Figure 10:
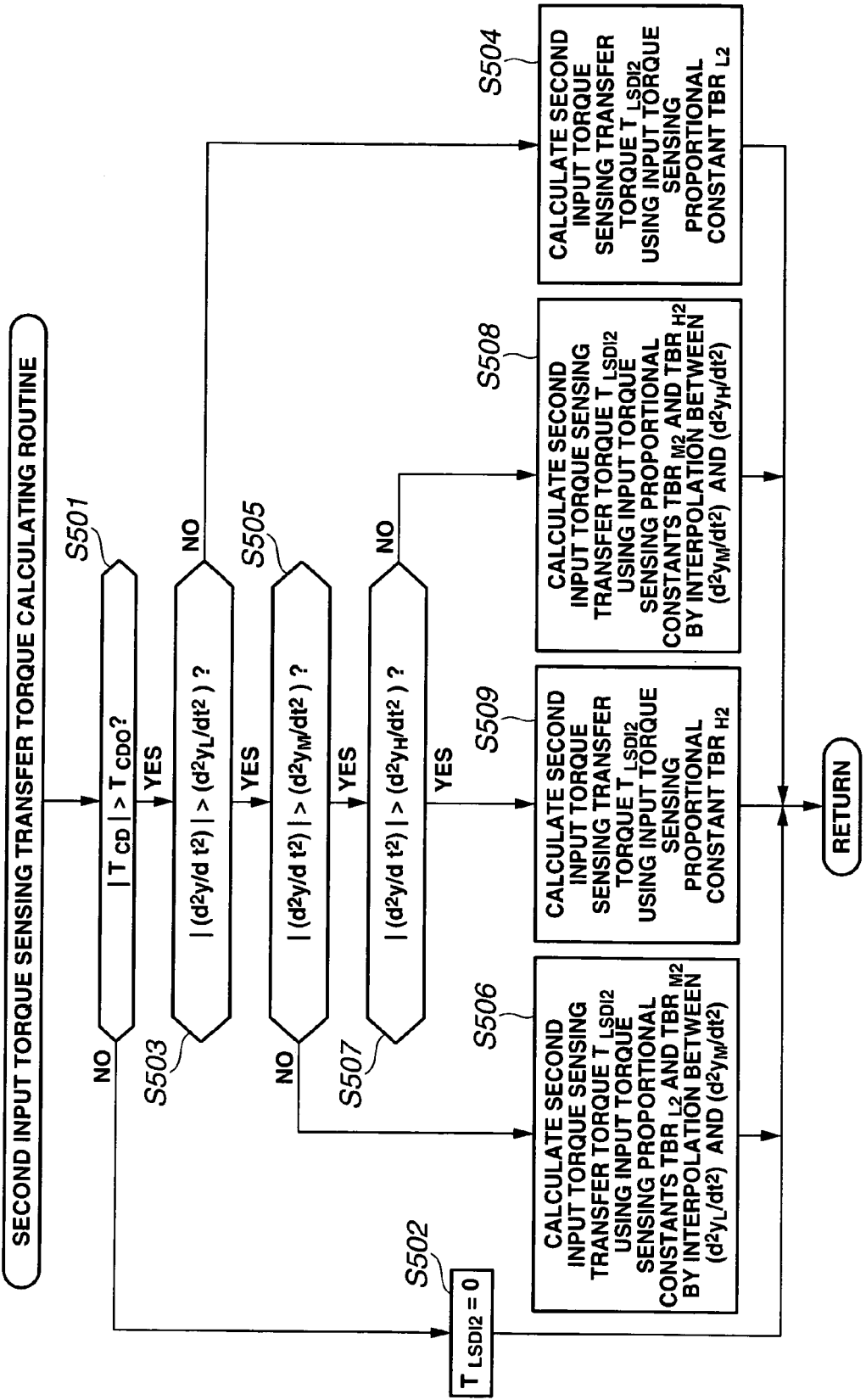
FIG. 10 is a flowchart of a second input torque sensitive transfer torque calculating routine.

FIG. 10 shows a second input torque sensitive transfer torque calculating routine executed by the second input torque sensitive transfer torque calculating section 46 in S206 above, and first of all, in S501 comparison is made between input torque TCD and a constant TCD0 that has been set in advance.

When the result of this comparison in S501 is that the input torque TCD is less than or equal to the constant TCD0, (TCD≦TCD0), processing advances to S502 where equation (9) above is implemented, namely TLSDI2=0, and the routine exits.

Also, if the result of this comparison in S501 is that the input torque TCD is larger than the constant TCD0 (TCD>TCD0) processing advances to S503.

In S503, comparison between actual lateral acceleration ($d^2y/dt^2$) and the constant ($d^2yL/dt^2$) is carried out. When the result of the comparison of S503 is that the actual lateral acceleration ($d^2y/dt^2$) is less than or equal to the constant ($d^2yL/dt^2$)(($d^2y/dt^2$)≦($d^2yL/dt^2$)), processing advances to S504 where the second input torque sensitive transfer torque TLSDI2 is calculated from equation (10) above using the input torque sensitive proportional constant TBRL2, and the routine exits.

Also, if the result of comparison in S503 is that actual lateral acceleration ($d^2y/dt^2$) is a greater value than the constant ($d^2yL/dt^2$) (($d^2y/dt^2$)>($d^2yL/dt^2$)), processing advances to S505 where comparison is made between actual lateral acceleration ($d^2y/dt^2$) and the constant ($d^2yM/dt^2$)(>($d^2yL/dt^2$)).

When the result of the comparison of S505 is that the actual lateral acceleration ($d^2y/dt^2$) is less than or equal to the constant ($d^2yM/dt^2$) (($d^2yL/dt^2$)<($d^2y/dt^2$)≦($d^2yM/dt^2$)), processing advances to S506 where the second input torque sensitive transfer torque TLSDI2 is calculated from equation (11) above using the input torque sensitive proportional constants TBRL2 and TBRM2 by interpolation between ($d^2yL/dt^2$) and ($d^2yM/dt^2$), and the routine exits.

Also, if the result of comparison in S505 is that actual lateral acceleration ($d^2y/dt^2$) is a greater value than the constant ($d^2yM/dt^2$) (($d^2y/dt^2$)>($d^2yM/dt^2$)), processing advances to S507 where comparison is made between actual lateral acceleration ($d^2y/dt^2$) and the constant ($d^2yH/dt^2$)(>($d^2yM/dt^2$)).

When the result of the comparison of S507 is that the actual lateral acceleration $(d^2y/dt^2)$ is less than or equal to the constant $(d^2yH/dt^2)$ $((d^2yM/dt^2)<(d^2y/dt^2)\leq(d^2yH/dt^2))$, processing advances to S508 where the second input torque sensitive transfer torque TLSDI2 is calculated from equation (12) above using the input torque sensitive proportional constants TBRM2 and TBRH2 by interpolation between $(d^2yM/dt^2)$ and $(d^2yH/dt^2)$, and the routine exits.

Also, when the result of the comparison of S507 is that the actual lateral acceleration $(d^2y/dt^2)$ is a larger value than the constant $(d^2yH/dt^2)((d^2y/dt^2)>(d^2yH/dt^2))$, processing advances to S509 where the second input torque sensitive transfer torque TLSDI2 is calculated from equation (13) above using the input torque sensitive proportional constant TBRH2, and the routine exits.

Figure 11:
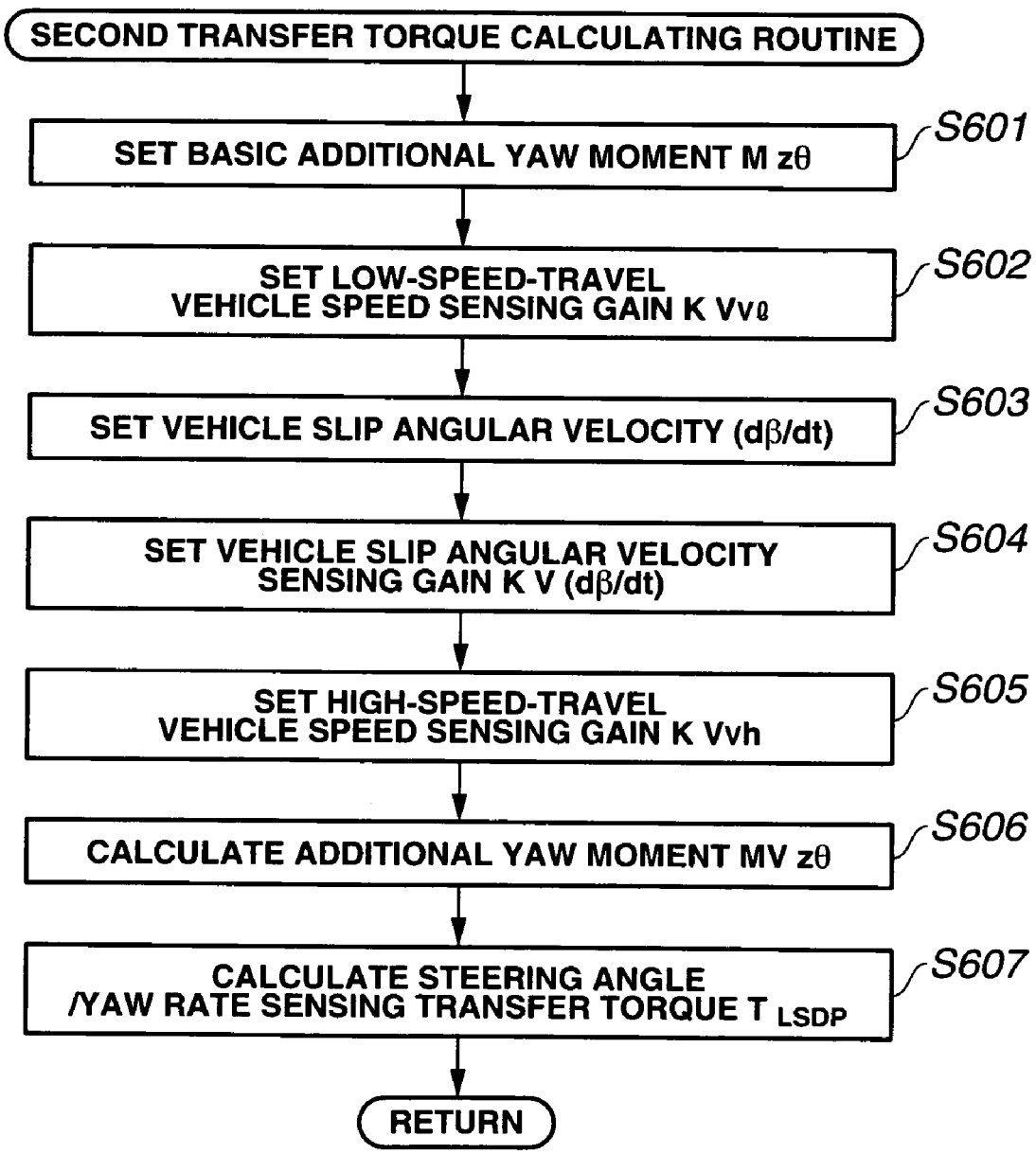
FIG. 11 is a flowchart of a second transfer torque calculating routine.

FIG. 11 shows a second transfer torque calculating routine executed by the second transfer torque calculating section 34 in S104 above, and first of all in S601 the basic additional yaw moment setting section 51 sets basic additional yaw moment Mzθ. Incidentally, this setting of the basic additional yaw moment Mzθ will be explained later with the flowchart of FIG. 12.

Next, processing advances to S602 where the low-speed-travel vehicle speed sensitive gain setting section 52 sets low-speed-travel vehicle speed sensitive gain KVv1.

Processing next advances to S603, where the vehicle slip angular velocity calculating section 53 calculates vehicle slip angular velocity $(d\beta/dt)$ using equation (30) described above.

Processing then advances to S604, where the vehicle slip angular velocity sensitive gain setting section 54 sets vehicle slip angular velocity sensitive gain $KV(d\beta/dt)$. The setting of the vehicle slip angular velocity sensitive gain $KV(d\beta/dt)$ will be described later with the flowchart of FIG. 13.

Next, processing advances to S605 where the high-speed-travel vehicle speed sensitive gain setting section 55 sets high-speed-travel vehicle speed sensitive gain KVvh.

Processing then advances to S606 and the steering angle/yaw rate sensitive transfer torque calculating section 56 calculates additional yaw moment MVzθ from equation (38) above, and advances to S607 where the steering angle/yaw rate sensitive transfer torque TLSDP is calculated from equation (39) or equation (40) above, and the routine exits.

Figure 12:
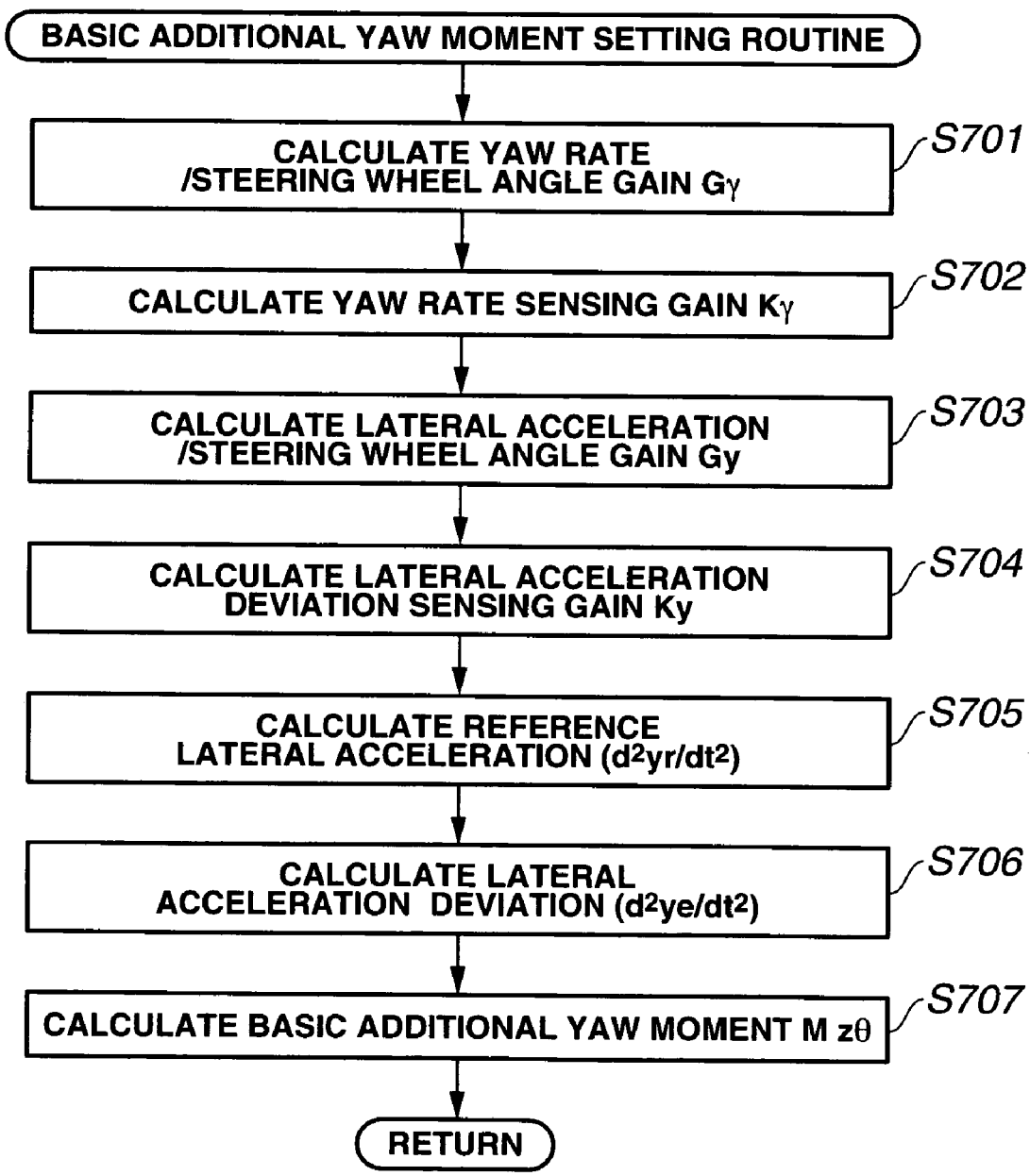
FIG. 12 is a flowchart of a basic additional yaw moment setting routine.

FIG. 12 shows a basic additional yaw moment setting routine executed by the basic additional yaw moment setting section 51 in S601 above, and first of all in S701 the yaw rate/steering wheel angle gain calculating section 63 calculates the yaw rate/steering wheel angle gain Gγ from equation (17) mentioned above.

Next, processing advances to S702, where the yaw rate sensitive gain calculating section 64 calculates yaw rate sensitive gain Kγ from previously mentioned equation (18).

Processing then advances to S703 where the lateral acceleration/steering wheel angle gain calculating section 61 calculates lateral acceleration/steering wheel angle gain Gy using equation (15) above.

Next processing advances to S704, where the lateral acceleration deviation sensitive gain calculating section 62 calculates lateral acceleration deviation sensitive gain Ky from equation (16) above.

Next processing advances to S705, where the reference lateral acceleration calculating section 65 calculates reference lateral acceleration $(d^2yr/dt^2)$ from equation (20) above.

Processing then advances to S706, where the lateral acceleration deviation calculating section 66 calculates lateral acceleration deviation $(d^2ye/dt^2)$ using equation (28) above.

Processing then advances to S707, where the basic additional yaw moment calculating section 67 calculates the basic additional yaw moment Mzθ using equation (29), and the routine exits.

Figure 13:
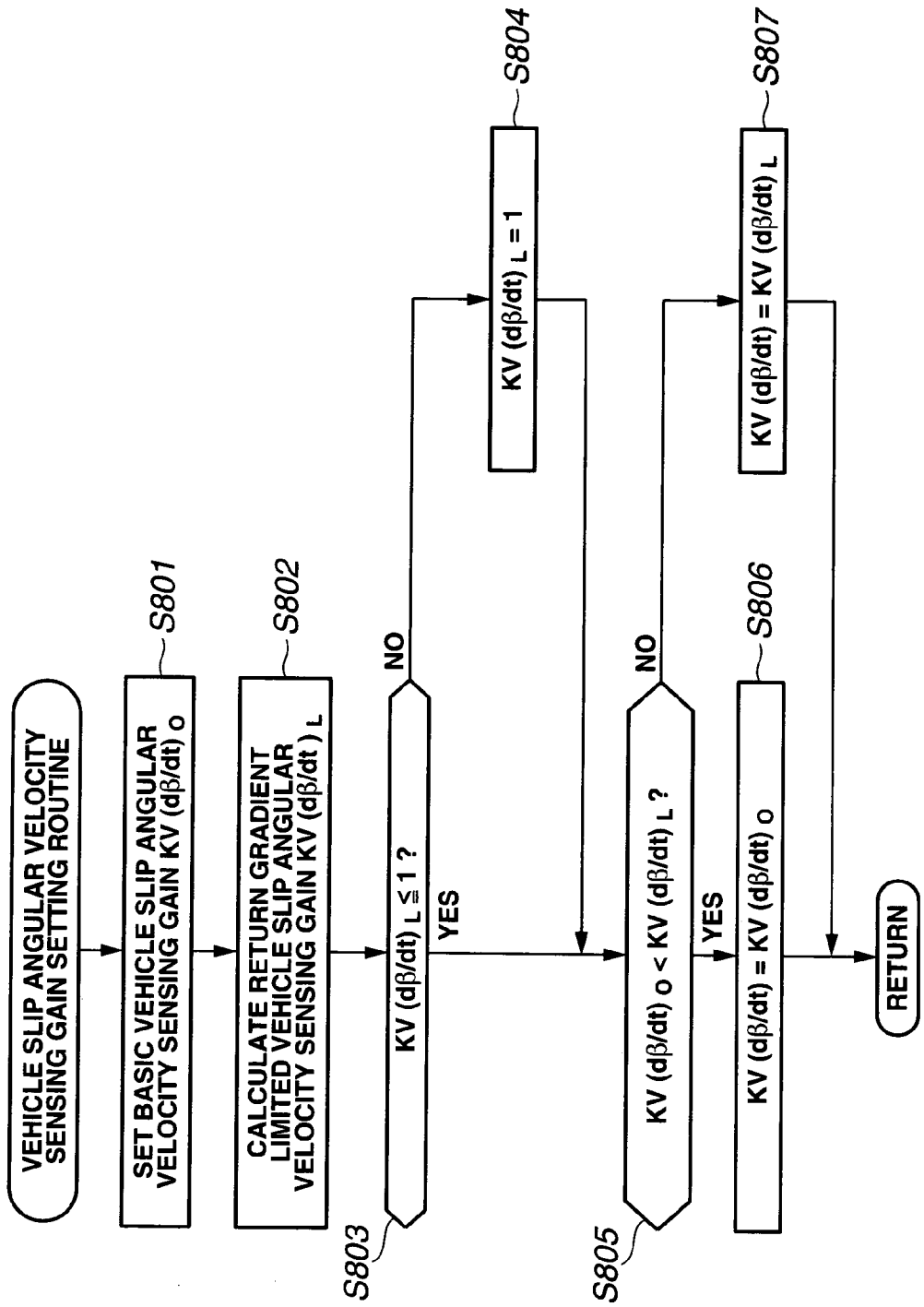
FIG. 13 is a flowchart of a vehicle slip angular velocity sensitive gain setting routine.

FIG. 13 shows a vehicle slip angular velocity sensitive gain setting routine executed by the vehicle slip angular velocity sensitive gain setting section 54 in S604 above, and first of all in S801 basic vehicle slip angular velocity sensitive gain $KV(d\beta/dt)0$ is set by referencing the map shown in FIG. 19, for example.

Processing next advances to S802, where the return gradient limited vehicle slip angular velocity sensitive gain $KV(d\beta/dt)L$ is calculated from equation (31) above.

Next, processing advances to S803, where it is determined whether or not the return gradient limited vehicle slip angular velocity sensitive gain $KV(d\beta/dt)L$ set in S802 is less than or equal to 1, and if it is less than or equal to 1 processing advances directly to S805, while if it is greater than 1 processing advances to S804 where the return gradient limited vehicle slip angular velocity sensitive gain $KV(d\beta/dt)L$ is made 1 and processing advances to S805.

In S805, the basic vehicle slip angular velocity sensitive gain $KV(d\beta/dt)0$ is compared with return gradient limited vehicle angular velocity sensitive gain $KV(d\beta/dt)L$, and if basic vehicle slip angular velocity sensitive gain $KV(d\beta/dt)0$ is smaller than the return gradient limited vehicle angular velocity sensitive gain $KV(d\beta/dt)L$ processing advances to S806 where the basic vehicle slip angular velocity sensitive gain $KV(d\beta/dt)0$ is set as vehicle slip angular velocity sensitive gain $KV(d\beta/dt)$, and the routine exits.

Conversely, if basic vehicle slip angular velocity sensitive gain $KV(d\beta/dt)0$ is greater than or equal to the return gradient limited vehicle angular velocity sensitive gain $KV(d\beta/dt)L$ the return gradient limited vehicle angular velocity sensitive gain $KV(d\beta/dt)L$ is set as vehicle slip angular velocity sensitive gain $KV(d\beta/dt)$, and the routine exits.

Figure 14:
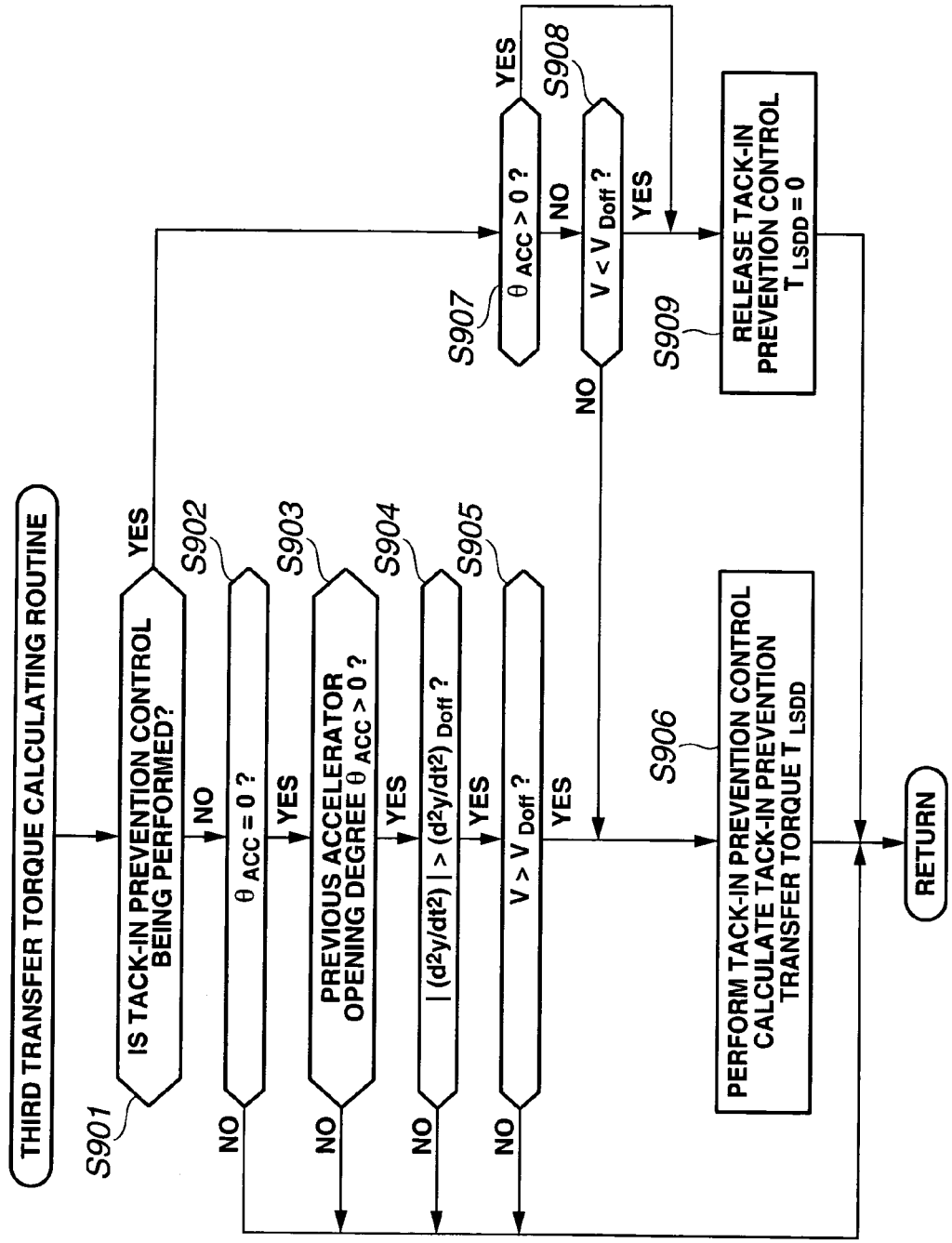
FIG. 14 is a flowchart of a third transfer torque calculating routine.

FIG. 14 shows a third transfer torque calculating routine executed by the third transfer torque calculating section 35 in S105 above, and first of all in S901 it is determined whether or not tack-in prevention control is currently being executed.

If the result of determination in S901 is that the tack-in prevention control is not being executed, processing advances to S902 where it is determined whether or not accelerator opening degree θACC is 0. If accelerator opening degree θACC is 0, processing advances to S903, where it is determined whether or not accelerator opening degree θACC the time before was larger than 0, and if it was larger than 0 processing advances to S904, where it is determined whether or not lateral acceleration $(d^2y/dt^2)$ is larger than a set value $(d^2y/dt^2)$Doff, processing advances to S905 if it is larger than the set value $(d^2y/dt^2)$Doff, where it is determined whether or not vehicle speed V is larger than a set value VDoff, and if vehicle speed V is larger than the VDoff processing advances to S906 where tack-in prevention control is executed, and the routine exits. The tack-in prevention transfer torque TLSDD at this time is calculated using equation (41) above. Also, if any one of S902 to S905 is not satisfied, the routine exits directly.

On the other hand, if it is determined in S901 that tack-in prevention control is being executed, processing advances to S907 where it is determined whether or not accelerator opening degree this time is greater than 0. If the result of this determination is that the accelerator opening degree this time is larger than 0, processing advances to S909 where the tack-in prevention control is released, the tack-in prevention transfer torque TLSDD is made 0 and the routine exits.

Also, if the determination result in S907 is the accelerator opening degree this time is less than 0 processing advances to S908, where it is determined whether or not vehicle speed V is smaller than a set value VDoff.

If the result of this determination in S909 is that the vehicle speed V is smaller than the set value VDoff, processing advances to S909 where the tack-in prevention control is released, the tack-in prevention transfer torque TLSDD is made 0 and the routine exits.

Conversely, if vehicle speed V is greater than the set value VDoff processing advances to S906 and tack-in prevention control resumes.

With this embodiment of the present invention, when input torque sensitive transfer torque TLSDI is obtained, in estimating engine torque TEG, by using separate time constants for increasing and decreasing engine torque it is possible to appropriately estimate input torque TCD to the transfer clutch 15, according to transition characteristics of the engine, there is only a slight delay in the rising of the input torque TCD when the accelerator is ON, and improvement in cornering is possible.

Also, with the input torque sensitive transfer torque TLSDI, when obtaining transfer torque TLSD for the transfer clutch 15, in a region where input torque TCD is large, amount of variation is changed by adding the second input torque sensitive transfer torque TLSDI2, which means that a larger transfer torque is added so that limited slip differential force is not insufficient when critical traveling at a low μ road, and it is possible to obtain stabilized grip force.

When obtaining input torque sensitive transfer torque TLSDI also, for actual lateral acceleration ($d^2y/dt^2$) by preparing three torque lines as reference, it is possible to achieve conformity of low μ road travel and high μ road travel simply.

Further, since vehicle slip angular velocity sensitive gain KV(dβ/dt) controlled by return gradient limited vehicle slip angular velocity sensitive gain KV(dβ/dt)L is used in steering angle/yaw rate sensitive transfer torque TLSDP calculated with steering angle feed forward control+yaw rate feed back control with lateral acceleration added, addition of an unnecessary turning moments in unstable and transitional states of the vehicle is reliably prevented, and front and rear drive power distribution is carried out with good precision and in a stable manner.

It is also possible to detect a tack-in phenomenon due to a driver's accelerator operation and effectively prevent the tack-in phenomenon using feed forward control.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A front and rear drive power distribution control device for a vehicle, comprising:
    clutch means for varying a drive power distribution between front and rear wheels;
    torque calculating means for calculating an engaging torque of the clutch means according to at least an input torque transmitted from an engine to the clutch means; and
    control means for controlling the clutch means on the basis of at least the engaging torque calculated by the torque calculating means,
    wherein the torque calculating means sets the engaging torque of the clutch means and has a higher degree of increased engagement torque value variation when the input torque is at a first value as compared to when the input torque is at a lower value than said first value.

2. The front and rear drive power distribution control device for the vehicle as disclosed in claim 1, wherein the torque calculating means variably sets the engaging torque depending on a lateral acceleration of the vehicle.

3. The front and rear drive power distribution control device for the vehicle as disclosed in claim 1, wherein the torque calculating means estimates the input torque from the engine in different ways based on variations in the engine torque.

4. The front and rear drive power distribution control device for the vehicle as disclosed in claim 1, wherein the torque calculating means estimates the input torque from the engine in different ways when engine torque is increasing and when engine torque is decreasing.

5. The front and rear drive power distribution control device for the vehicle as disclosed in claim 1, wherein the torque calculating means estimates the input torque from the engine by way of using different delay characteristics based on when engine torque is increasing and when engine torque is decreasing.

6. The front and rear drive power distribution control device for the vehicle as disclosed in claim 2, wherein the torque calculating means estimates the input torque from the engine by way of using different delay characteristics based on when engine torque is increasing and when engine torque is decreasing.

7. The front and rear drive power distribution control device for the vehicle as disclosed in claim 1, further comprising:
    tack-in prevention torque calculating means for calculating an additional engaging torque for preventing a tack-in phenomenon of the vehicle when an accelerator opening degree is at zero,
    wherein the control means controls the clutch means based on at least the engaging torque calculated by the torque calculating means and the additional engaging torque calculated by the tack-in prevention torque calculating means.

8. The front and rear drive power distribution control device for the vehicle as disclosed in claim 2, further comprising:
    tack-in prevention torque calculating means for calculating an additional engaging torque for preventing a tack-in phenomenon of the vehicle when accelerator opening degree is at zero,
    wherein the control means controls the clutch means based on at least the engaging torque calculated by the torque calculating means and the additional engaging torque calculated by the tack-in prevention torque calculating means.

9. The front and rear drive power distribution control device for the vehicle as disclosed in claim 6, further comprising:
    tack-in prevention torque calculating means for calculating an additional engaging torque for preventing a tack-in phenomenon of the vehicle when an accelerator opening degree is at zero,
    wherein the control means controls the clutch means based on at least the engaging torque calculated by the torque calculating means and the additional engaging torque calculated by the tack-in prevention torque calculating means.

10. The front and rear drive power distribution control device for the vehicle as disclosed in claim 7, wherein the tack-in prevention torque calculating means calculates the additional engaging torque for preventing the tack-in phenomenon of the vehicle according to a vehicle speed and a lateral acceleration of the vehicle.

11. The front and rear drive power distribution control device for the vehicle as disclosed in claim 8, wherein the tack-in prevention torque calculating means calculates the additional engaging torque for preventing the tack-in phenomenon of the vehicle according to a vehicle speed and a lateral acceleration of the vehicle.

12. The front and rear drive power distribution control device for the vehicle as disclosed in claim 9, wherein the tack-in prevention torque calculating means calculates the additional engaging torque for preventing the tack-in phenomenon of the vehicle according to a vehicle speed and a lateral acceleration of the vehicle.

13. A front and rear drive power distribution control device for a vehicle, comprising:
   clutch means for varying a drive power distribution between front and rear wheels;
   first torque calculating means for calculating a first engaging torque of the clutch means according to an input torque from an engine;
   second torque calculating means for estimating a yaw moment added to the vehicle and calculating a second engaging torque of the clutch means according to the yaw moment; and
   control means for controlling the clutch means based on at least the first engaging torque and the second engaging torque,
   wherein the second torque calculating means corrects the yaw moment according to a vehicle slip angular velocity, and sets an upper limit on a variation of the yaw moment per time.

14. The front and rear drive power distribution control device for the vehicle as disclosed in claim 13, wherein, when a vehicle speed is smaller than a first predetermined speed value, the second torque calculating means reduces the absolute value of the yaw moment.

15. The front and rear drive power distribution control device for the vehicle as disclosed in claim 13, wherein, when a vehicle speed is higher than a second predetermined speed value and an absolute value of a lateral acceleration of the vehicle is smaller than a predetermined lateral acceleration value, the second torque calculating means reduces the absolute value of the yaw moment.

16. The front and rear drive power distribution control device for the vehicle as disclosed in claim 14, wherein, when a vehicle speed is higher than a second predetermined speed value and an absolute value of a lateral acceleration of the vehicle is smaller than a predetermined lateral acceleration value, the second torque calculating means corrects the absolute value of the yaw moment to have a smaller value as compared to a correction of the absolute value of the yaw moment determined by the second torque calculating means when the vehicle speed is higher than the second predetermined speed value or the absolute value of lateral acceleration of the vehicle is greater than the predetermined lateral acceleration value.

17. The front and rear drive power distribution control device for a vehicle as disclosed in claim 1, wherein the torque calculating means sets the engaging torque of the clutch means such that a first slope of the engaging torque relative to the input torque when the input torque is smaller than a predetermined value is smaller than a second slope of the engaging torque relative to the input torque when the input torque is larger than a predetermined value.

18. The front and rear drive power distribution control device for a vehicle as disclosed in claim 1, wherein the torque calculating means sets the engaging torque of the clutch means such that the variation of the engaging torque relative to the input torque is set larger as the input torque becomes larger.

19. The front and rear drive power distribution control device for a vehicle as disclosed in claim 1, wherein the torque calculating means includes a first torque calculating means for calculating a first engaging torque based on the input torque and a second torque calculating means for calculating a second engaging torque based on a yaw moment added to the vehicle, and wherein the torque calculating means calculates the engaging torque based on a sum of the first torque and the second torque, and wherein the second torque is zero when the input torque is lower than a predetermined input torque value and the second torque is a positive value when the input torque is higher than the predetermined input torque value.

20. The front and rear drive power distribution control device for a vehicle as disclosed in claim 13, wherein the second torque calculating means corrects the yaw moment based on a vehicle slip angular velocity sensitive gain, wherein said gain is a smaller one of a basic vehicle slip angular velocity sensitive gain which is calculated based on the vehicle slip angular velocity and a return gradient limited vehicle slip angular velocity gain which is a monotonically increasing value per time.

* * * * *